(12) United States Patent
Ishikawa

(10) Patent No.: US 7,091,511 B2
(45) Date of Patent: Aug. 15, 2006

(54) RADIATION IMAGE READ-OUT METHOD AND APPARATUS

(75) Inventor: Hiromi Ishikawa, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 105 days.

(21) Appl. No.: 09/939,659

(22) Filed: Aug. 28, 2001

(65) Prior Publication Data

US 2002/0024028 A1    Feb. 28, 2002

(30) Foreign Application Priority Data

Aug. 28, 2000  (JP) ............................. 2000-257788
Aug. 28, 2000  (JP) ............................. 2000-257835

(51) Int. Cl.
*G03B 42/08* (2006.01)

(52) U.S. Cl. .................................... 250/584
(58) Field of Classification Search ................ 250/584
See application file for complete search history.

(56) References Cited

U.S. PATENT DOCUMENTS

| 4,816,679 | A |   | 3/1989  | Sunagawa et al. ....... 250/327.2 |
| 4,922,103 | A |   | 5/1990  | Kawajiri et al. ............ 250/327 |
| 5,594,752 | A | * | 1/1997  | Endriz ......................... 347/241 |
| 6,157,756 | A | * | 12/2000 | Ishiwata ....................... 385/31 |
| 6,373,074 | B1| * | 4/2002  | Mueller et al. ............. 250/584 |
| 2001/0022349 | A1 |  | 9/2001 | Takahashi |
| 2003/0010945 | A1 | * | 1/2003 | Ishikawa ..................... 250/585 |

FOREIGN PATENT DOCUMENTS

| JP | 60-111568   | 6/1985  |
| JP | 60-236354   | 11/1985 |
| JP | 1-101540    | 4/1989  |
| WO | WO-99/28765 | * 6/1999 |

* cited by examiner

*Primary Examiner*—David Porta
*Assistant Examiner*—Shun Lee
(74) *Attorney, Agent, or Firm*—Sughrue Mion, PLLC

(57) ABSTRACT

Stimulating rays are linearly irradiated onto an area of a stimulable phosphor sheet, and light emitted by the sheet is detected with a line sensor. A device for irradiating the stimulating rays comprises laser diodes and a cylindrical lens. The laser diodes are located such that laser beams produced by the laser diodes as the stimulating rays stand in a row along the length direction of the linear area of the sheet exposed to the stimulating rays. Each laser diode is located in an orientation such that a beam spread direction normal to a junction plane approximately coincides with the direction, along which the laser beams stand in a row. The cylindrical lens converges each laser beam only in a plane normal to the direction, along which the laser beams stand in a row, and onto the sheet.

10 Claims, 12 Drawing Sheets

FIG. 5A
FIG. 5B
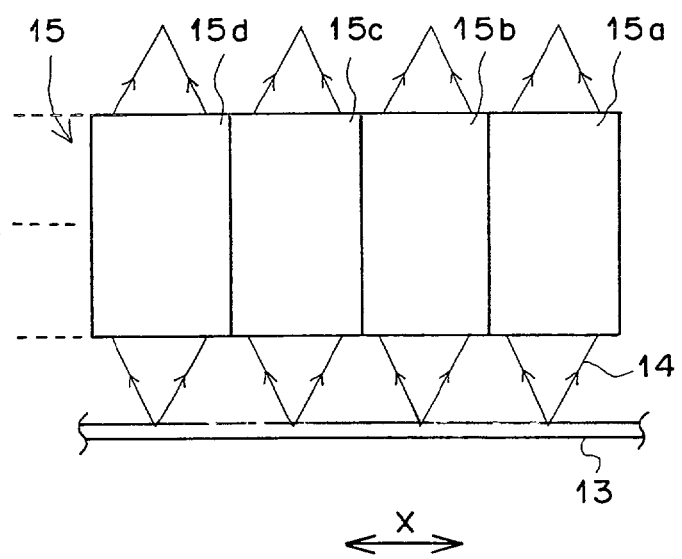
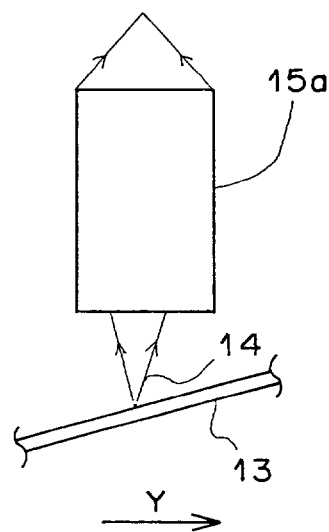

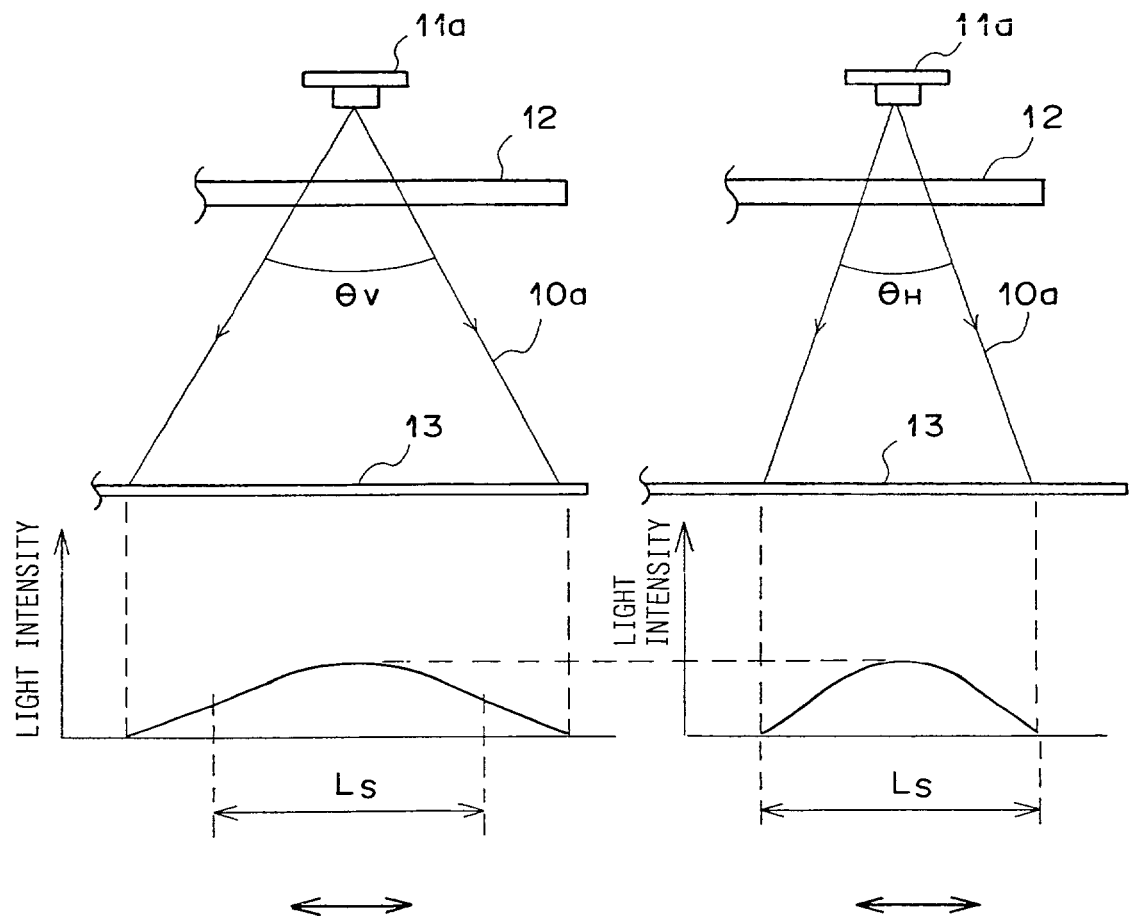

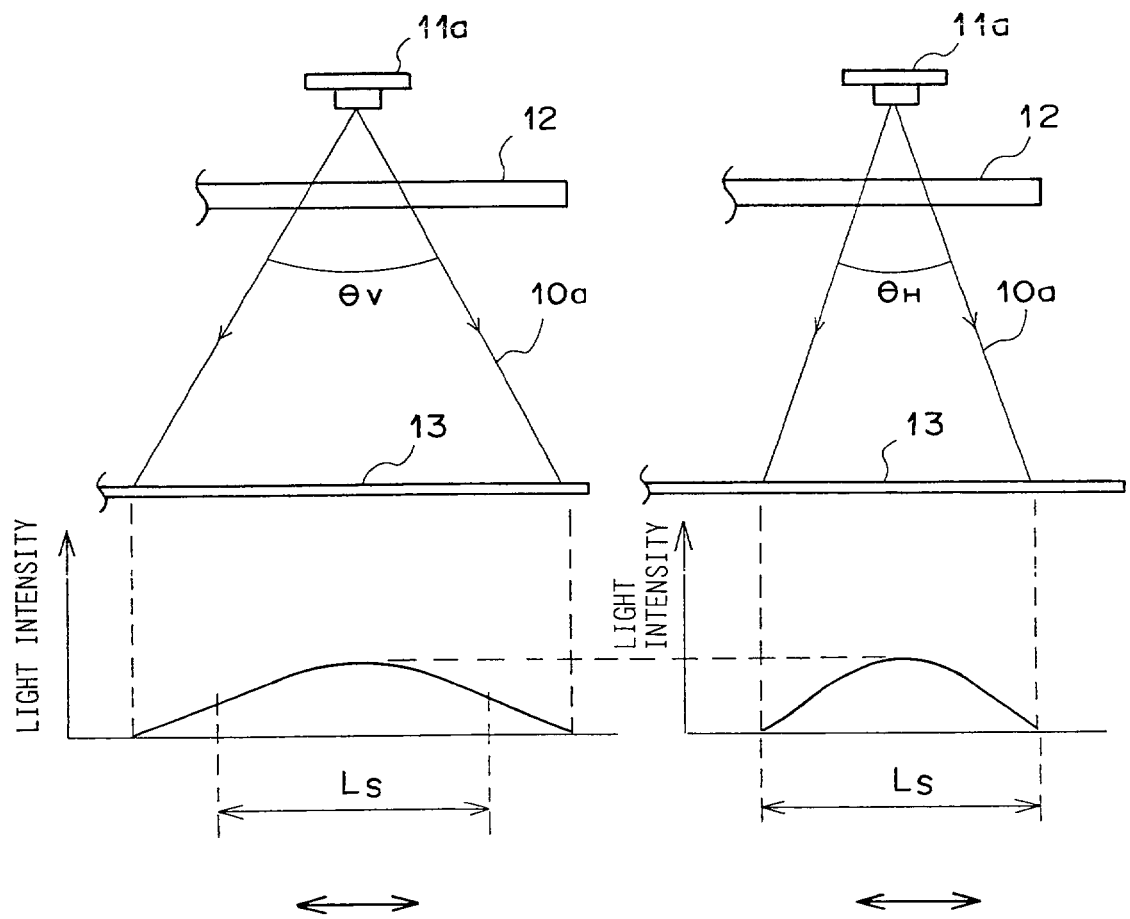

RADIATION IMAGE READ-OUT METHOD AND APPARATUS

BACKGROUND OF THE INVENTION

1. Field of the Invention

This invention relates to a radiation image read-out method and apparatus, wherein stimulating rays are irradiated to a stimulable phosphor sheet, on which a radiation image has been stored, and light, which is emitted by the stimulable phosphor sheet when the stimulable phosphor sheet is exposed to the stimulating rays, is photoelectrically detected, an image signal representing the radiation image being thereby obtained. This invention particularly relates to a radiation image read-out method and apparatus, wherein the stimulating rays are linearly irradiated to the stimulable phosphor sheet, and the light emitted by the stimulable phosphor sheet is detected with a line sensor.

2. Description of the Related Art

Radiation image recording and reproducing systems, wherein a stimulable phosphor sheet, which comprises a substrate and a layer of a stimulable phosphor overlaid on the substrate, have heretofore been widely used in practice.

With the radiation image recording and reproducing systems, a stimulable phosphor sheet is exposed to radiation carrying image information of an object, such as a human body, and a radiation image of the object is thereby recorded on the stimulable phosphor sheet. Thereafter, stimulating rays, such as a laser beam, are caused to scan the stimulable phosphor sheet in two-dimensional directions. The stimulating rays cause an exposed area of the stimulable phosphor sheet to emit light in proportion to the amount of energy stored thereon during its exposure to the radiation. The light emitted from the exposed area of the stimulable phosphor sheet, upon stimulation thereof, is photoelectrically detected and converted into an electric image signal by photoelectric read-out means.

The image signal, which has been obtained from the radiation image recording and reproducing systems described above, is then subjected to image processing, such as gradation processing and processing in the frequency domain, such that a visible radiation image, which has good image quality and can serve as an effective tool in, particularly, the efficient and accurate diagnosis of an illness, can be obtained. The image signal having been obtained from the image processing is utilized for reproducing a visible image for diagnosis, or the like, on film or displaying a visible image for diagnosis, or the like, on a cathode ray tube (CRT) display device. In cases where the stimulable phosphor sheet, from which the image signal has been detected, is then exposed to erasing light, and energy remaining on the stimulable phosphor sheet is thereby released, the erased stimulable phosphor sheet is capable of being used again for the recording of a radiation image.

Also, a novel radiation image recording and reproducing system aiming at enhancement of a detection quantum efficiency in the formation of the radiation image, i.e., a radiation absorptivity, a light emission efficiency, an emitted light pickup efficiency, and the like, wherein a novel type of stimulable phosphor sheet is utilized, has been proposed in, for example, Japanese Patent Application No. 11(1999)-372978. With the novel type of the stimulable phosphor sheet utilized in the proposed radiation image recording and reproducing system, the radiation absorbing functions and the energy storing functions of the conventional stimulable phosphor sheet are separated from each other.

The novel type of the stimulable phosphor sheet utilized in the proposed radiation image recording and reproducing system contains a layer of a stimulable phosphor for energy storage, which is capable of absorbing light having wavelengths falling within an ultraviolet to visible region and thereby storing energy of the light having wavelengths falling within the ultraviolet to visible region, and which is capable of being stimulated by light having wavelengths falling within a visible to infrared region and thereby radiating out the stored energy as emitted light.

The novel type of the stimulable phosphor sheet should preferably take on the form combined with a layer of a phosphor for radiation absorption, which is capable of absorbing radiation and being caused to emit light having wavelengths falling within an ultraviolet to visible region. In such cases, energy from the light having wave lengths falling within the ultraviolet to visible region, which light is emitted from the layer of the phosphor for radiation absorption when the layer of the phosphor for radiation absorption is exposed to the radiation carrying image information of an object, (the amount of the energy corresponding to the radiation image information) is stored on the layer of the stimulable phosphor for energy storage. When the stimulable phosphor sheet, on which the radiation image has thus been stored, is scanned with the stimulating rays, the light carrying the radiation image information is emitted from the layer of the stimulable phosphor for energy storage.

The novel type of the stimulable phosphor sheet need not necessarily be provided with the layer of the phosphor for radiation absorption. In such cases, the novel type of the stimulable phosphor sheet is utilized in combination with a fluorescent screen, which is provided with the layer of the phosphor for radiation absorption capable of absorbing radiation and being caused to emit the light having wavelengths falling within the ultraviolet to visible region.

Specifically, in such cases, the fluorescent screen is kept in close contact with the novel type of the stimulable phosphor sheet, and the radiation carrying the image information of the object is irradiated to the fluorescent screen. As a result, the light having wavelengths falling within the ultraviolet to visible region is emitted from the layer of the phosphor for radiation absorption of the fluorescent screen. Also, energy from the light emitted from the phosphor for radiation absorption (the amount of the energy corresponding to the radiation image information) is stored on the layer of the stimulable phosphor for energy storage of the stimulable phosphor sheet. When the stimulable phosphor sheet, on which the radiation image has thus been stored, is scanned with the stimulating rays, the light carrying the radiation image information is emitted from the layer of the stimulable phosphor for energy storage.

Novel radiation image read-out apparatuses for use in the radiation image recording and reproducing systems described above have been proposed in, for example, Japanese Unexamined Patent Publication Nos. 60(1985)-111568, 60(1985)-236354, and 1(1989)-101540. In the proposed radiation image read-out apparatuses, from the point of view of keeping the emitted light detection time short, reducing the size of the apparatus, and keeping the cost low, a line sensor comprising a charge coupled device (CCD) image sensor, or the like, is utilized as the photoelectric read-out means.

Basically, the radiation image read-out apparatuses of such types comprise:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a line sensor comprising a plurality of photoelectric conversion devices arrayed along the linear area of the stimulable phosphor sheet exposed to the linear stimulating rays, and iii) sub-scanning means for moving the stimulable phosphor sheet with respect to the stimulating ray irradiating means and the line sensor and in a direction (a sub-scanning direction) intersecting with a length direction of the linear area of the stimulable phosphor sheet exposed to the linear stimulating rays (a main scanning direction).

The stimulating ray irradiating means for linearly irradiating the stimulating rays onto the stimulable phosphor sheet in the manner described above may be constituted so as to produce fan beam-like stimulating rays. Alternatively, the stimulating ray irradiating means may be constituted so as to deflect a thin beam and to cause the deflected thin beam to linearly scan the stimulable phosphor sheet.

As the stimulating ray irradiating means, which produces the fan beam-like stimulating rays, from the viewpoint of keeping the size of the apparatus small and reducing the cost, it may be considered to employ a single laser diode (a semiconductor laser). In such cases, in order for a large main scanning width may be obtained, a lens optical system for converging a laser beam, which has been radiated out in a divergent state from the laser diode, with respect to the sub-scanning direction so as to form a linear beam, and expanding the laser beam with respect to the main scanning direction intersecting with the sub-scanning direction has heretofore been employed.

However, with the conventional technique described above, the problems occur in that, in cases where a large main scanning width is to be obtained, the distance between the laser diode and the stimulable phosphor sheet must be set to be long, and therefore it is not always possible to keep the size of the apparatus small.

Also, the intensity of the laser beam radiated out from the laser diode takes the maximum value at the center region of the beam and becomes low at the peripheral region of the beam. Thus the laser beam radiated out from the laser diode has the so-called Gaussian intensity distribution. Therefore, the conventional radiation image read-out apparatuses, wherein a single laser diode is employed as the stimulating ray irradiating means, have the problems in that the intensity of the stimulating rays becomes non-uniform along the main scanning direction.

SUMMARY OF THE INVENTION

The primary object of the present invention is to provide a radiation image read-out method, wherein laser diodes are employed as a stimulating ray source, such that a size of a radiation image read-out apparatus is capable of being kept small, and such that an intensity distribution of stimulating rays along a main scanning direction is capable of being made uniform.

Another object of the present invention is to provide a radiation image read-out method, wherein a laser diode is employed as a stimulating ray source, and a laser beam produced by the laser diode is converged by a cylindrical lens into a linear beam and irradiated onto a stimulable phosphor sheet, such that a beam diameter of the laser beam is capable of being made uniform along a main scanning direction.

The specific object of the present invention is to provide an apparatus for carrying out the radiation image read-out method.

The present invention provides a first radiation image read-out method, comprising the steps of:

i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation, ii) receiving light, which is emitted by the stimulable phosphor sheet, with a line sensor comprising a plurality of photoelectric conversion devices arrayed along the linear area of the stimulable phosphor sheet exposed to the linear stimulating rays, the received light being subjected to photoelectric conversion performed by the line sensor, and iii) moving the stimulable phosphor sheet with respect to the stimulating ray irradiating means and the line sensor and in a direction intersecting with a length direction of the linear area of the stimulable phosphor sheet exposed to the linear stimulating rays, wherein the stimulating ray irradiating means comprises:

a plurality of laser diodes located such that laser beams, which have been produced by the laser diodes and act as the stimulating rays, stand in a row along the length direction of the linear area of the stimulable phosphor sheet exposed to the linear stimulating rays, each of the laser diodes being located in an orientation such that a beam spread direction, which is normal to a junction plane, approximately coincides with the direction, along which the laser beams stand in a row, and a cylindrical lens for converging each of the laser beams, which have been produced by the laser diodes, only in a plane normal to the direction, along which the laser beams stand in a row, and onto the stimulable phosphor sheet.

The present invention also provides a second radiation image read-out method, comprising the steps of:

i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation, ii) receiving light, which is emitted by the stimulable phosphor sheet, with a line sensor comprising a plurality of photoelectric conversion devices arrayed along the linear area of the stimulable phosphor sheet exposed to the linear stimulating rays, the received light being subjected to photoelectric conversion performed by the line sensor, and iii) moving the stimulable phosphor sheet with respect to the stimulating ray irradiating means and the line sensor and in a direction intersecting with a length direction of the linear area of the stimulable phosphor sheet exposed to the linear stimulating rays, wherein the stimulating ray irradiating means comprises:

a plurality of laser diodes located such that laser beams, which have been produced by the laser diodes and act as the stimulating rays, stand in a row along the length direction of the linear area of the stimulable phosphor sheet exposed to the linear stimulating rays, a cylindrical lens for converging each of the laser beams, which have been produced by the laser diodes, only in a plane normal to the direction, along which the laser beams stand in a row, and onto the stimulable phosphor sheet, and optical devices, each of which is located between one of the laser diodes and the cylindrical lens and scatters the laser beam having been produced by the corresponding laser diode.

The present invention further provides a third radiation image read-out method, comprising the steps of:

i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation, ii) receiving light, which is emitted by the stimulable phosphor sheet, with a line sensor comprising a plurality of photoelectric conversion devices arrayed along the linear area of the stimulable phosphor sheet exposed to the linear stimulating rays, the received light being subjected to photoelectric conversion performed by the line sensor, and iii) moving the stimulable phosphor sheet with respect to the stimulating ray irradiating means and the line sensor and in a direction intersecting with a length direction of the linear area of the stimulable phosphor sheet exposed to the linear stimulating rays, wherein the stimulating ray irradiating means comprises:

a plurality of laser diodes located such that laser beams, which have been produced by the laser diodes and act as the stimulating rays, stand in a row along the length direction of the linear area of the stimulable phosphor sheet exposed to the linear stimulating rays, each of the laser diodes being located in an orientation such that a beam spread direction, which is normal to a junction plane, approximately coincides with the direction, along which the laser beams stand in a row, a cylindrical lens for converging each of the laser beams, which have been produced by the laser diodes, only in a plane normal to the direction, along which the laser beams stand in a row, and onto the stimulable phosphor sheet, and optical devices, each of which is located between one of the laser diodes and the cylindrical lens and scatters the laser beam having been produced by the corresponding laser diode.

In each of the first, second, and third radiation image read-out methods in accordance with the present invention, the plurality of the laser diodes should preferably be located such that the laser beams, which have been produced by the laser diodes adjacent to each other among the plurality of the laser diodes, stand in a row so as to have an overlapping region, at which the laser beams overlap each other.

Also, in each of the first, second, and third radiation image read-out methods in accordance with the present invention, the stimulable phosphor sheet may be a stimulable phosphor sheet having both the functions for radiation absorption and the functions for energy storage. Alternatively, the stimulable phosphor sheet may be a stimulable phosphor sheet provided with the layer of the stimulable phosphor for energy storage.

In cases where the stimulable phosphor sheet is a stimulable phosphor sheet provided with the layer of the stimulable phosphor for energy storage, the stimulable phosphor sheet may also be provided with the layer of the phosphor for radiation absorption. Alternatively, in such cases, the stimulable phosphor sheet may not be provided with the layer of the phosphor for radiation absorption and may be utilized in combination with the fluorescent screen having the layer of the phosphor for radiation absorption.

As will be understood from the specification, it should be noted that the term "moving a stimulable phosphor sheet with respect to stimulating ray irradiating means and a line sensor" as used herein means movement of the stimulable phosphor sheet relative to the stimulating ray irradiating means and the line sensor, and embraces the cases wherein the stimulable phosphor sheet is moved while the stimulating ray irradiating means and the line sensor are kept stationary, the cases wherein the stimulating ray irradiating means and the line sensor are moved while the stimulable phosphor sheet is kept stationary, and the cases wherein both the stimulable phosphor sheet and the stimulating ray irradiating means and the line sensor are moved. In cases where the stimulating ray irradiating means and the line sensor are moved, they should be moved together with each other.

The present invention still further provides a first radiation image read-out apparatus, comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a line sensor, which comprises a plurality of photoelectric conversion devices arrayed along the linear area of the stimulable phosphor sheet exposed to the linear stimulating rays, and iii) sub-scanning means for moving the stimulable phosphor sheet with respect to the stimulating ray irradiating means and the line sensor and in a direction intersecting with a length direction of the linear area of the stimulable phosphor sheet exposed to the linear stimulating rays, wherein the stimulating ray irradiating means comprises:

a plurality of laser diodes located such that laser beams, which have been produced by the laser diodes and act as the stimulating rays, stand in a row along the length direction of the linear area of the stimulable phosphor sheet exposed to the linear stimulating rays, each of the laser diodes being located in an orientation such that a beam spread direction, which is normal to a junction plane, approximately coincides with the direction, along which the laser beams stand in a row, and a cylindrical lens for converging each of the laser beams, which have been produced by the laser diodes, only in a plane normal to the direction, along which the laser beams stand in a row, and onto the stimulable phosphor sheet.

The present invention also provides a second radiation image read-out apparatus, comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a line sensor, which comprises a plurality of photoelectric conversion devices arrayed along the linear area of the stimulable phosphor sheet exposed to the linear stimulating rays, and iii) sub-scanning means for moving the stimulable phosphor sheet with respect to the stimulating ray irradiating means and the line sensor and in a direction intersecting with a length direction of the linear area of the stimulable phosphor sheet exposed to the linear stimulating rays, wherein the stimulating ray irradiating means comprises:

a plurality of laser diodes located such that laser beams, which have been produced by the laser diodes and act as the stimulating rays, stand in a row along the length direction of the linear area of the stimulable phosphor sheet exposed to the linear stimulating rays, a cylindrical lens for converging each of the laser beams, which have been produced by the laser diodes, only in a plane normal to the direction, along which the laser beams stand in a row, and onto the stimulable phosphor sheet, and optical devices, each of which is located between one of the laser diodes and the cylindrical lens and scatters the laser beam having been produced by the corresponding laser diode.

The present invention further provides a third radiation image read-out apparatus, comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a line sensor, which comprises a plurality of photoelectric conversion devices arrayed along the linear area of the stimulable phosphor sheet exposed to the linear stimulating rays, and iii) sub-scanning means for moving the stimulable phosphor sheet with respect to the stimulating ray irradiating means and the line sensor and in a direction intersecting with a length direction of the linear area of the stimulable phosphor sheet exposed to the linear stimulating rays, wherein the stimulating ray irradiating means comprises:

a plurality of laser diodes located such that laser beams, which have been produced by the laser diodes and act as the stimulating rays, stand in a row along the length direction of the linear area of the stimulable phosphor sheet exposed to the linear stimulating rays, each of the laser diodes being located in an orientation such that a beam spread direction, which is normal to a junction plane, approximately coincides with the direction, along which the laser beams stand in a row, a cylindrical lens for converging each of the laser beams, which have been produced by the laser diodes, only in a plane normal to the direction, along which the laser beams stand in a row, and onto the stimulable phosphor sheet, and optical devices, each of which is located between one of the laser diodes and the cylindrical lens and scatters the laser beam having been produced by the corresponding laser diode.

In each of the first, second, and third radiation image read-out apparatuses in accordance with the present invention, the plurality of the laser diodes should preferably be located such that the laser beams, which have been produced by the laser diodes adjacent to each other among the plurality of the laser diodes, stand in a row so as to have an overlapping region, at which the laser beams overlap each other.

Also, in each of the first, second, and third radiation image read-out apparatuses in accordance with the present invention, the stimulable phosphor sheet may be a stimulable phosphor sheet having both the functions for radiation absorption and the functions for energy storage. Alternatively, the stimulable phosphor sheet may be a stimulable phosphor sheet provided with the layer of the stimulable phosphor for energy storage.

In cases where the stimulable phosphor sheet is a stimulable phosphor sheet provided with the layer of the stimulable phosphor for energy storage, the stimulable phosphor sheet may also be provided with the layer of the phosphor for radiation absorption. Alternatively, in such cases, the stimulable phosphor sheet may not be provided with the layer of the phosphor for radiation absorption and may be utilized in combination with the fluorescent screen having the layer of the phosphor for radiation absorption.

The present invention still further provides a fourth radiation image read-out method, comprising the steps of:

i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation, ii) receiving light, which is emitted by the stimulable phosphor sheet, with a line sensor comprising a plurality of photoelectric conversion devices arrayed along the linear area of the stimulable phosphor sheet exposed to the linear stimulating rays, the received light being subjected to photoelectric conversion performed by the line sensor, and iii) moving the stimulable phosphor sheet with respect to the stimulating ray irradiating means and the line sensor and in a direction intersecting with a length direction of the linear area of the stimulable phosphor sheet exposed to the linear stimulating rays, wherein the stimulating ray irradiating means comprises:

a laser diode, which produces a laser beam acting as the stimulating rays, and a cylindrical lens, which converges the laser beam with respect to one direction in order to form a linear laser beam, and which has a curvature varying over a lens longitudinal direction, such that a beam diameter of the linear laser beam at the linear area of the stimulable phosphor sheet exposed to the linear stimulating rays becomes uniform.

The present invention also provides a fourth radiation image read-out apparatus, comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a line sensor, which comprises a plurality of photoelectric conversion devices arrayed along the linear area of the stimulable phosphor sheet exposed to the linear stimulating rays, and iii) sub-scanning means for moving the stimulable phosphor sheet with respect to the stimulating ray irradiating means and the line sensor and in a direction intersecting with a length direction of the linear area of the stimulable phosphor sheet exposed to the linear stimulating rays, wherein the stimulating ray irradiating means comprises:

a laser diode, which produces a laser beam acting as the stimulating rays, and a cylindrical lens, which converges the laser beam with respect to one direction in order to form a linear laser beam, and which has a curvature varying over a lens longitudinal direction, such that a beam diameter of the linear laser beam at the linear area of the stimulable phosphor sheet exposed to the linear stimulating rays becomes uniform.

The fourth radiation image read-out method and apparatus in accordance with the present invention should preferably be modified such that a plurality of laser diodes are located such that the laser beams, which have been produced by the laser diodes and act as the stimulating rays, stand in a row along a length direction of the linear area of the stimulable phosphor sheet exposed to the linear stimulating rays.

In such cases, the plurality of the laser diodes should preferably be located such that the laser beams, which have been produced by the laser diodes adjacent to each other among the plurality of the laser diodes, stand in a row so as to have an overlapping region, at which the laser beams overlap each other.

Also, in the fourth radiation image read-out method and apparatus in accordance with the present invention, the stimulable phosphor sheet may be a stimulable phosphor sheet having both the functions for radiation absorption and the functions for energy storage. Alternatively, the stimulable phosphor sheet may be a stimulable phosphor sheet provided with the layer of the stimulable phosphor for energy storage.

In cases where the stimulable phosphor sheet is a stimulable phosphor sheet provided with the layer of the stimulable phosphor for energy storage, the stimulable phosphor sheet may also be provided with the layer of the phosphor for radiation absorption. Alternatively, in such cases, the stimulable phosphor sheet may not be provided with the layer of the phosphor for radiation absorption and may be utilized in combination with the fluorescent screen having the layer of the phosphor for radiation absorption.

With the first radiation image read-out method and apparatus in accordance with the present invention, the plurality of the laser diodes constituting the stimulating ray irradiating means are located such that the laser beams, which have been produced by the laser diodes and act as the stimulating rays, stand in a row along the length direction of the linear area of the stimulable phosphor sheet exposed to the linear stimulating rays. Therefore, with the laser beams standing in a row along the length direction of the linear area of the stimulable phosphor sheet exposed to the linear stimulating rays, a long linear area of the stimulable phosphor sheet exposed to the linear stimulating rays, i.e. a large main scanning width, is capable of being obtained as a whole. Accordingly, in cases where a large main scanning width is to be obtained, the distance between the laser diodes and the stimulable phosphor sheet is capable of being set to be comparatively short. As a result, the size of the radiation image read-out apparatus is capable of being kept small.

Also, with the first radiation image read-out method and apparatus in accordance with the present invention, each of the laser diodes constituting the stimulating ray irradiating means is located in the orientation such that the beam spread direction, which is normal to the junction plane, approximately coincides with the direction, along which the laser beams stand in a row. The location of each laser diode in the orientation described above also contributes to reduction in size of the radiation image read-out apparatus.

Specifically, in the cases of an ordinary laser diode, a beam spread angle $\theta_H$ in the direction parallel with the junction plane falls within the range of approximately 8° to approximately 10°. However, a beam spread angle $\theta_V$ in the direction normal to the junction plane is ordinarily as large as approximately 20° to approximately 25°. Therefore, in cases where each of the laser diodes is located in the orientation described above, the laser beam having been produced by the laser diode impinges upon the stimulable phosphor sheet in a state in which the laser beam has spread more widely than when the laser diode is located in other orientations. Accordingly, in cases where a large main scanning width is to be obtained, the distance between the laser diodes and the stimulable phosphor sheet is capable of being set to be comparatively short. As a result, the size of the radiation image read-out apparatus is capable of being minimized.

Further, with the first radiation image read-out method and apparatus in accordance with the present invention, wherein the laser diodes are located in the orientation described above such that the laser beams having been produced by the laser diodes spread widely, a change in beam intensity (i.e., a change in intensity of the stimulating rays) along the main scanning line becomes smaller than when the laser diodes are located in other orientations, i.e. than when the spread of the laser beams is small. Therefore, with the first radiation image read-out method and apparatus in accordance with the present invention, in cases where an identical main scanning width is to be obtained, the intensity of the stimulating rays over the main scanning width becomes more uniform than when the laser diodes are located in other orientations.

With the second radiation image read-out method and apparatus in accordance with the present invention, the plurality of the laser diodes constituting the stimulating ray irradiating means are located such that the laser beams, which have been produced by the laser diodes and act as the stimulating rays, stand in a row along the length direction of the linear area of the stimulable phosphor sheet exposed to the linear stimulating rays. Therefore, as in the first radiation image read-out method and apparatus in accordance with the present invention, with the laser beams standing in a row along the length direction of the linear area of the stimulable phosphor sheet exposed to the linear stimulating rays, a long linear area of the stimulable phosphor sheet exposed to the linear stimulating rays, i.e. a large main scanning width, is capable of being obtained as a whole. Accordingly, in cases where a large main scanning width is to be obtained, the distance between the laser diodes and the stimulable phosphor sheet is capable of being set to be comparatively short. As a result, the size of the radiation image read-out apparatus is capable of being kept small.

Also, with the second radiation image read-out method and apparatus in accordance with the present invention, each of the optical devices is located between one of the laser diodes and the cylindrical lens in order to scatter the laser beam having been produced by the corresponding laser diode. Therefore, the laser beam having been produced by the laser diode impinges upon the stimulable phosphor sheet in a state in which the laser beam has spread more widely than when the laser diode is located in other orientations. Accordingly, the distance between the laser diodes and the stimulable phosphor sheet is capable of being set to be comparatively short. As a result, the size of the radiation image read-out apparatus is capable of being minimized.

Further, with the second radiation image read-out method and apparatus in accordance with the present invention, wherein the laser beam having been produced by each of the laser diode is scattered by the corresponding optical device, the original intensity distribution (i.e., the Gaussian intensity distribution) of the laser beam is disturbed by the scattering with the optical device. Therefore, the intensity of the laser beam, which impinges as the stimulating rays upon the stimulable phosphor sheet, becomes more uniform than when the laser beam having been produced by the laser diode is not scattered by the optical device.

With the third radiation image read-out method and apparatus in accordance with the present invention, the plurality of the laser diodes are located in the same manner as that in the first radiation image read-out method and apparatus in accordance with the present invention. Also, as in the second radiation image read-out method and apparatus in accordance with the present invention, the optical devices are utilized in order to scatter the laser beams having been produced by the laser diodes. Therefore, synergistic effects of minimizing the size of the radiation image read-out apparatus are capable of being obtained from the location of the laser diodes in the manner described above and the utilization of the optical devices.

With each of the first, second, and third radiation image read-out methods and apparatuses in accordance with the present invention, the plurality of the laser diodes maybe located such that the laser beams, which have been produced by the laser diodes adjacent to each other among the plurality of the laser diodes, stand in a row so as to have the overlapping region, at which the laser beams overlap each other. In such cases, the effects of making the intensity of the stimulating rays uniform along the main scanning direction are capable of being enhanced even further.

Specifically, each of the laser beams having been produced by the laser diodes has the Gaussian intensity distribution, i.e. the intensity distribution such that the intensity of the laser beam takes the maximum value at the center region of the beam and becomes low at the peripheral region of the beam. Therefore, in cases where the two laser beams, which have been produced by the two laser diodes adjacent to each other, stand in a row so as to have the overlapping region, at which the laser beams overlap each other, the peripheral region of one of the two adjacent laser beams, at which peripheral region the intensity of the laser beam is low, overlaps upon the peripheral region of the other laser beam, at which peripheral region the intensity of the laser beam is low. As a result, the beam intensity (i.e., the intensity of the stimulating rays) at the overlapping region becomes high. Accordingly, the intensity of the stimulating rays along the main scanning direction becomes uniform.

The fourth radiation image read-out method and apparatus in accordance with the present invention have the effects described below.

Specifically, the laser beam, which is produced as the stimulating rays by the laser diode, is radiated out in a radial form from the emission point of the laser diode. Therefore, the travel distance of the laser beam from the emission point of the laser diode to the stimulable phosphor sheet is shortest at the center region of the beam and becomes long at the peripheral region of the beam. Accordingly, in cases where an ordinary cylindrical lens, whose curvature is uniform over the lens longitudinal direction, is utilized as the cylindrical lens for converging the laser beam into a fan beam-like form, if the laser beam is converged such that the position, to which the center region of the beam is converged, coincides with the position on the stimulable phosphor sheet, the position, to which the peripheral region of the beam is converged, will shift to the side upstream from the stimulable phosphor sheet, i.e. to the side close to the laser diode.

Accordingly, with the fourth radiation image read-out method and apparatus in accordance with the present invention, the cylindrical lens, which has the curvature varying over the lens longitudinal direction such that the beam diameter of the linear laser beam at the linear area of the stimulable phosphor sheet exposed to the linear stimulating rays becomes uniform, is utilized as the cylindrical lens for converging the laser beam having been produced by the laser diode. Specifically, basically, a cylindrical lens, whose curvature takes the maximum value at the position, through which the center region of the laser beam passes, and takes a small value (i.e., a large radius of curvature) at the position, through which the peripheral region of the laser beam passes, is utilized as the cylindrical lens for converging the laser beam having been produced by the laser diode. In such cases, the position, to which the peripheral region of the beam is converged, shifts from the side close to the laser diode toward the side remote from the laser diode. Therefore, the beam diameter of the laser beam is capable of being made uniform along the linear area of the stimulable phosphor sheet exposed to the linear laser beam.

Also, with the fourth radiation image read-out method and apparatus in accordance with the present invention, a plurality of laser diodes may be located such that the laser beams, which have been produced by the laser diodes and act as the stimulating rays, stand in a row along the length direction of the linear area of the stimulable phosphor sheet exposed to the linear stimulating rays. In such cases, with the laser beams standing in a row along the length direction of the linear area of the stimulable phosphor sheet exposed to the linear stimulating rays, a long linear area of the stimulable phosphor sheet exposed to the linear stimulating rays, i.e. a large main scanning width, is capable of being obtained as a whole. Accordingly, in cases where a large main scanning width is to be obtained, the distance between the laser diodes and the stimulable phosphor sheet is capable of being set to be comparatively short. As a result, the size of the radiation image read-out apparatus is capable of being kept small.

Further, with the fourth radiation image read-out method and apparatus in accordance with the present invention, the plurality of the laser diodes may be located such that the laser beams, which have been produced by the laser diodes adjacent to each other among the plurality of the laser diodes, stand in a row so as to have the overlapping region, at which the laser beams overlap each other. In such cases, the effects of making the intensity of the stimulating rays uniform along the main scanning direction are capable of being obtained.

Specifically, each of the laser beams having been produced by the laser diodes has the Gaussian intensity distribution, i.e. the intensity distribution such that the intensity of the laser beam takes the maximum value at the center region of the beam and becomes low at the peripheral region of the beam. Therefore, in cases where the two laser beams, which have been produced by the two laser diodes adjacent to each other, stand in a row so as to have the overlapping region, at which the laser beams overlap each other, the peripheral region of one of the two adjacent laser beams, at which peripheral region the intensity of the laser beam is low, overlaps upon the peripheral region of the other laser beam, at which peripheral region the intensity of the laser beam is low. As a result, the beam intensity (i.e., the intensity of the stimulating rays) at the overlapping region becomes high. Accordingly, the intensity of the stimulating rays along the main scanning direction becomes uniform.

BRIEF DESCRIPTION OF THE DRAWINGS

FIG. 5A is a front view showing a lens array employed in the first embodiment of FIG. 1, FIG. 5B is a side view showing the lens array of FIG. 5A, FIGS. 6A and 6B are explanatory views showing effects of the first embodiment of FIG. 1, FIGS. 13A and 13B are explanatory views showing how a laser beam, which has been produced by a laser diode employed in the fourth embodiment of FIG. 1, spreads.

DESCRIPTION OF THE PREFERRED EMBODIMENTS

The present invention will hereinbelow be described in further detail with reference to the accompanying drawings.

Figure 1:
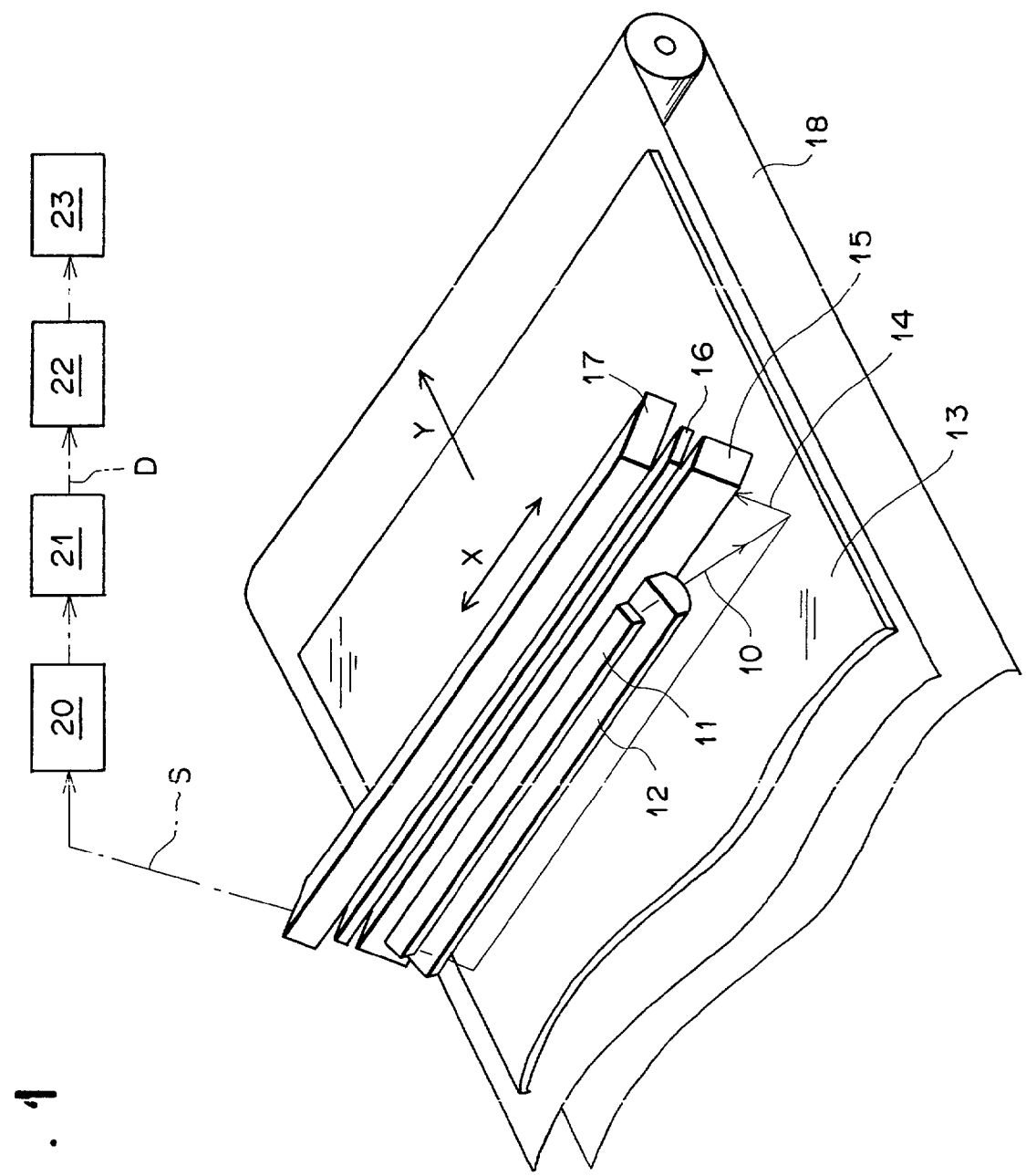
FIG. 1 is a perspective view showing a first embodiment of the radiation image read-out apparatus in accordance with the present invention.
Figure 2:
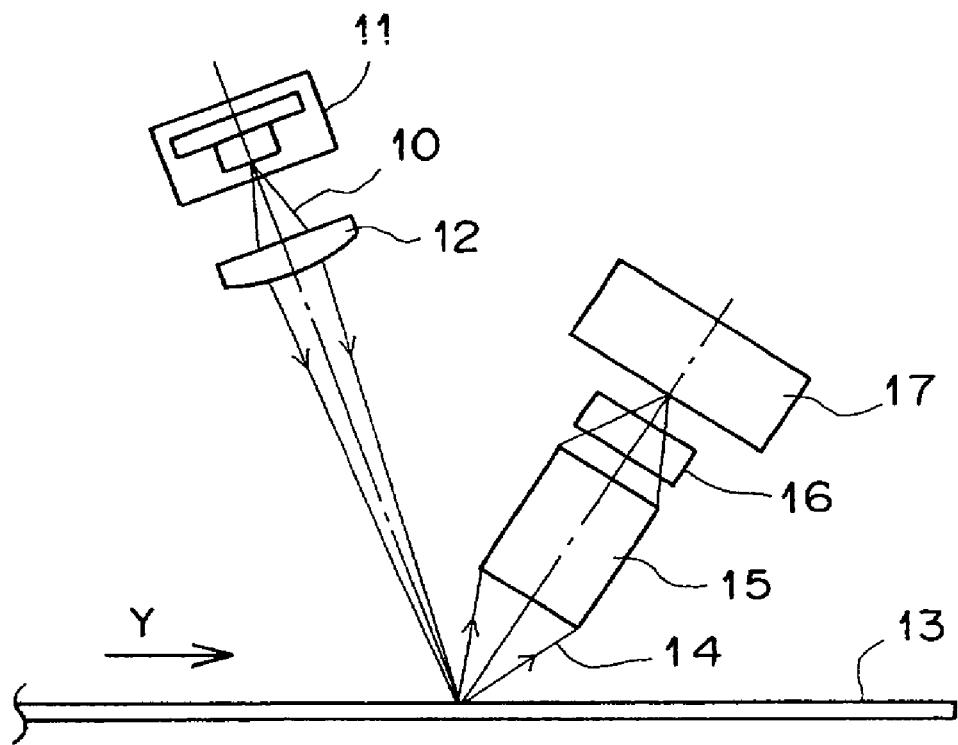
FIG. 2 is a side view showing a read-out optical system employed in the first embodiment of FIG. 1.
Figure 3:
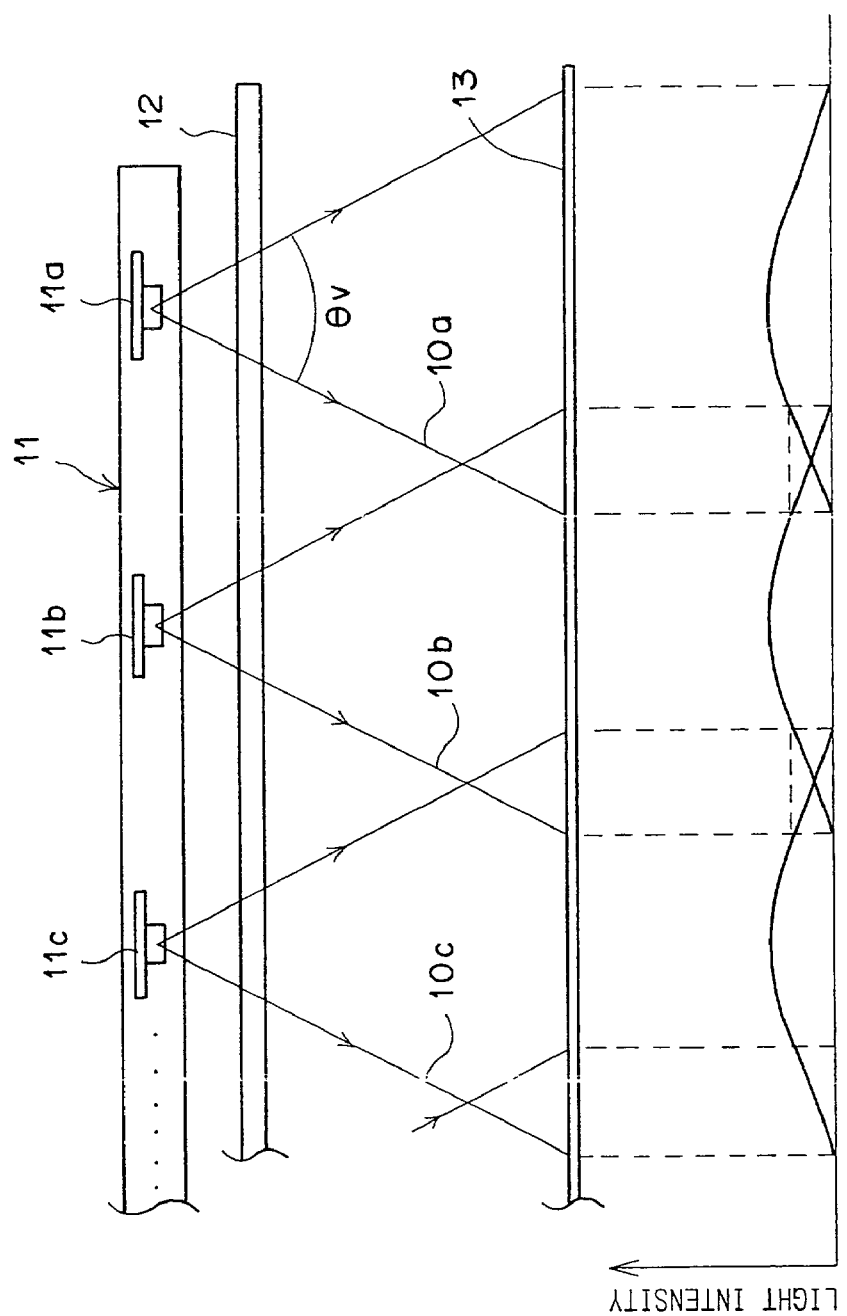
FIG. 3 is a front view showing the read-out optical system of FIG. 2.

FIG. 1 is a perspective view showing a first embodiment of the radiation image read-out apparatus in accordance with the present invention. FIG. 2 is a side view showing a read-out optical system employed in the first embodiment of FIG. 1. FIG. 3 is a front view showing the read-out optical system of FIG. 2.

As illustrated in FIG. 1, the radiation image read-out apparatus comprises a laser diode array 11 for producing fan beam-like stimulating rays 10. The radiation image read-out apparatus also comprises a cylindrical lens 12 for converging the stimulating rays 10 only in the plane of the sheet of FIG. 2 in order to form linear stimulating rays 10. The radiation image read-out apparatus further comprises a lens array 15 for collecting light 14, which has been emitted from a linear area of a stimulable phosphor sheet 13 exposed to the linear stimulating rays 10. The radiation image read-out apparatus still further comprises a stimulating ray cut-off filter 16, which is located in an optical path of the emitted light 14 having passed through the lens array 15. The radiation image read-out apparatus also comprises a CCD line sensor 17 for detecting the emitted light 14, which has passed through the stimulating ray cut-off filter 16. The radiation image read-out apparatus further comprises an endless belt 18, which acts as sub-scanning means for moving the stimulable phosphor sheet 13 at a predetermined speed and in the direction indicated by the arrow Y, i.e. in the direction normal to the length direction (the direction indicated by the double headed arrow X) of the linear area of the stimulable phosphor sheet 13 exposed to the linear stimulating rays 10.

The radiation image read-out apparatus still further comprises an amplifier 20 for amplifying an analog light detection signal S, which has been fed out from the CCD line sensor 17. The radiation image read-out apparatus also comprises an analog-to-digital converter 21 for digitizing the analog light detection signal S, which has been amplified by the amplifier 20, into a digital image signal D. The digital image signal D, which has been obtained from the analog-to-digital converter 21, is fed into an image processing unit 22, which performs image processing on the digital image signal D. The digital image signal D, which has been obtained from the image processing performed by the image processing unit 22, is fed into an image reproducing apparatus 23.

As illustrated in FIG. 3, the laser diode array 11 comprises a plurality of laser diodes 11a, 11b, 11c, . . . arrayed in a line. By way of example, each of the laser diodes 11a, 11b, 11c, . . . produces a laser beam (the stimulating rays) having a wavelength of 660 nm. The laser diodes 11a, 11b, 11c, . . . respectively produce stimulating rays 10a, 10b, 10c, . . . in a divergent light state. The stimulating rays 10a, 10b, 10c, . . . , which have been produced by the laser diodes 11a, 11b, 11c, . . . , are converged by the cylindrical lens 12 with respect to only one direction and into fan beams. The stimulating rays 10, which are composed of the fan beams standing in a row, are linearly irradiated onto the linear area of the stimulable phosphor sheet 13.

Each of the laser diodes 11a, 11b, 11c, . . . is located in an orientation such that a beam spread direction, which is normal to a junction plane, coincides with the direction, along which the stimulating rays 10a, 10b, 10c, . . . stand in a row. Specifically, a beam spread angle of each of the stimulating rays 10a, 10b, 10c, . . . , which beam spread angle is illustrated in FIG. 3, is a beam spread angle $\theta_V$ with respect to the direction, which is normal to the junction plane.

Figure 4:
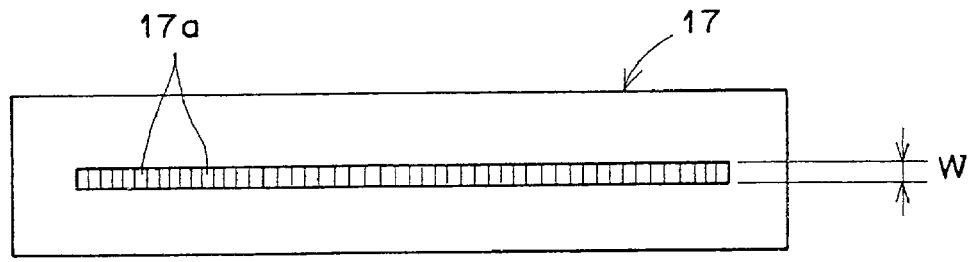
FIG. 4 is a plan view showing a line sensor employed in the first embodiment of FIG. 1.

FIG. 4 is a plan view showing the CCD line sensor 17 employed in the first embodiment of FIG. 1. As illustrated in FIG. 4, the CCD line sensor 17 comprises a plurality of sensor chips (photoelectric conversion devices) 17a, 17a, . . . , which are arrayed in a line. In this embodiment, a light receiving width of the CCD line sensor 17, which light receiving width is taken in the direction normal to the array direction of the sensor chips 17a, 17a, . . . , i.e. a width W of each of the sensor chips 17a, 17a, . . . , is approximately equal to 100 µm.

The CCD line sensor 17 is located in an orientation such that the sensor chips 17a, 17a, . . . stand side by side along the length direction of the linear area of the stimulable phosphor sheet 13 exposed to the linear stimulating rays 10, i.e. along the direction indicated by the double headed arrow X in FIG. 1. In cases where the stimulable phosphor sheet 13 has a large width, the CCD line sensor 17 may be composed of a plurality of line sensors, which are arrayed so as to stand in a row along the length direction of the CCD line sensor 17.

FIG. 5A is a front view showing the lens array 15 employed in the first embodiment of FIG. 1. FIG. 5B is a side view showing the lens array 15 of FIG. 5A. As illustrated in FIGS. 5A and 5B, the lens array 15 comprises, for example, a plurality of distributed index lenses 15a, 15b, 15c, 15d, . . . , which are arrayed in a line. Each of the distributed index lenses 15a, 15b, 15c, 15d, . . . collects the emitted light 14 having been emitted by the stimulable phosphor sheet 13. Also, as illustrated in FIG. 1, each of the distributed index lenses 15a, 15b, 15c, 15d, . . . guides the emitted light 14 toward the CCD line sensor 17. The lens array 15 is located in an orientation such that the distributed index lenses 15a, 15b, 15c, 15d, . . . stand side by side along the length direction of the linear area of the stimulable phosphor sheet 13 exposed to the linear stimulating rays 10, i.e. along the direction indicated by the double headed arrow X in FIG. 1.

How the first embodiment of the radiation image read-out apparatus in accordance with the present invention operates will be described hereinbelow.

The stimulable phosphor sheet 13 carries a radiation image of an object stored thereon by, for example, being exposed to radiation carrying radiation image information of the object. The stimulable phosphor sheet 13, on which the radiation image has been stored, is moved by the endless belt 18 at a predetermined speed and in the direction indicated by the arrow Y. Also, the stimulating rays 10 are produced by the laser diode array 11. The stimulating rays 10, which have been produced by the laser diode array 11, are linearly irradiated to an area of the stimulable phosphor sheet 13.

When the stimulating rays 10 are linearly irradiated to the area of the stimulable phosphor sheet 13, the linear area of the stimulable phosphor sheet 13 exposed to the linear stimulating rays 10 emits the light 14 having intensity in accordance with the radiation image having been stored on the stimulable phosphor sheet 13. The emitted light 14, which may be, for example, blue light, is collected by the lens array 15 and guided toward the CCD line sensor 17. The emitted light 14 is photoelectrically detected by the CCD line sensor 17. The stimulating rays 10, which are reflected from the stimulable phosphor sheet 13 and travel toward the CCD line sensor 17, are filtered out by the stimulating ray cut-off filter 16.

The CCD line sensor 17 photoelectrically detects the emitted light 14 and feeds out the analog light detection signal S, which corresponds to the intensity of the emitted light 14 (i.e., which represents the radiation image having been stored on the stimulable phosphor sheet 13). The analog light detection signal S is amplified by the amplifier 20 and converted by the analog-to-digital converter 21 into the digital image signal D.

Thereafter, the digital image signal D is fed into the image processing unit 22, which performs the image processing, such as gradation processing, on the digital image signal D. The digital image signal D, which has been obtained from the image processing performed by the image processing unit 22, is fed into the image reproducing apparatus 23 and is utilized for reproducing the radiation image, which has been stored on the stimulable phosphor sheet 13, as a visible image. The image reproducing apparatus 23 may be displaying means constituted of a CRT display device, or the like. Alternatively, the image reproducing apparatus 23 may be a recording apparatus for performing light scanning recording on photosensitive film.

The state of spread and the intensity distribution of each of the stimulating rays 10a, 10b, 10c, . . . will be described hereinbelow with reference to FIG. 3. In the first embodiment of the radiation image read-out apparatus in accordance with the present invention, the output of each of the laser diodes 11a, 11b, 11c, . . . constituting the laser diode array 11 is 50 mW. By way of example, the laser diode array 11 comprises 30 laser diodes 11a, 11b, 11c, . . . The large number of the laser diodes 11a, 11b, 11c, . . . are thus utilized, and the stimulating rays 10a, 10b, 10c, . . . , which have been produced by the laser diodes 11a, 11b, 11c, . . . , are set so as to stand in a row and are linearly irradiated to the stimulable phosphor sheet 13. Therefore, with the first embodiment of the radiation image read-out apparatus in accordance with the present invention, in cases where an identical main scanning width is to be obtained, the distance between the laser diodes 11a, 11b, 11c, . . . and the stimulable phosphor sheet 13 is capable of being set to be shorter than when only one laser diode is utilized. As a result, the size of the radiation image read-out apparatus is capable of being kept small.

Also, as for each of the laser diodes 11a, 11b, 11c, . . . , the beam spread angle $\theta_V$ in the direction normal to the junction plane, which beam spread angle is illustrated in FIG. 3, is equal to 22°. A beam spread angle $\theta_H$ in the direction parallel with the junction plane is equal to 10°. In the first embodiment, each of the laser diodes 11a, 11b, 11c, . . . is located in an orientation such that the beam spread direction, in which the beam spread angle $\theta_V$ of as large as 22° is obtained, coincides with the direction, along which the stimulating rays 10a, 10b, 10c, . . . stand in a row. Therefore, the stimulating rays 10a, 10b, 10c, . . . , which have been produced by the laser diodes 11a, 11b, 11c, . . . , impinge upon the stimulable phosphor sheet 13 in a state in which the stimulating rays 10a, 10b, 10c, . . . spread more widely than when each of the laser diodes 11a, 11b, 11c, . . . is located in other orientations. Accordingly, the distance between the laser diodes 11a, 11b, 11c, . . . and the stimulable phosphor sheet 13 is capable of being set to be short. As a result, the size of the radiation image read-out apparatus is capable of being minimized.

Further, with the first embodiment of the radiation image read-out apparatus in accordance with the present invention, wherein the laser diodes 11a, 11b, 11c, . . . are located in the orientation described above such that the stimulating rays 10a, 10b, 10c, . . . having been produced by the laser diodes 11a, 11b, 11c, . . . spreadwidely, a change in beam intensity (i.e., a change in intensity of the stimulating rays) along the main scanning line becomes smaller than when the laser diodes 11a, 11b, 11c, . . . are located in other orientations, i.e. than when the spread of the stimulating rays 10a, 10b, 10c, . . . is small. FIGS. 6A and 6B show such effects of the first embodiment by taking the laser diode 11a as an example.

FIG. 6A shows how the intensity of the stimulating rays 10a is distributed along the main scanning direction indicated by the double headed arrow X on the stimulable phosphor sheet 13 in cases where the laser diode 11a is located in the orientation such that the beam spread direction, which is normal to the junction plane, coincides with the direction, along which the stimulating rays 10a, 10b, 10c, . . . stand in a row, as in the first embodiment. FIG. 6B shows how the intensity of the stimulating rays 10a is distributed along the main scanning direction indicated by the double headed arrow X on the stimulable phosphor sheet 13 in cases where the laser diode 11a is located in an orientation such that the beam spread direction, which is parallel with the junction plane, coincides with the direction, along which the stimulating rays 10a, 10b, 10c, . . . stand in a row. As illustrated in FIGS. 6A and 6B, with the first embodiment of the radiation image read-out apparatus in accordance with the present invention, in cases where an identical main scanning width Ls is to be obtained, the intensity of the stimulating rays 10a over the main scanning width Ls becomes more uniform than when the laser diode is located in other orientations.

Furthermore, in the first embodiment of the radiation image read-out apparatus in accordance with the present invention, as illustrated in FIG. 3, the laser diodes 11a, 11b, 11c, . . . are located such that the stimulating rays, which have been produced by the laser diodes adjacent to each other among the plurality of the laser diodes 11a, 11b, 11c, . . . , (specifically, for example, the stimulating rays 10a and the stimulating rays 10b, the stimulating rays 10b and the stimulating rays 10c, and so on) stand in a row so as to have an overlapping region, at which the stimulating rays overlap each other. At the bottom part of FIG. 3, the intensity distributions of the stimulating rays 10a, 10b, 10c, . . . along the main scanning direction are also illustrated. As clear from the intensity distributions shown in FIG. 3, in cases where the two adjacent stimulating rays have the overlapping region, at which the stimulating rays overlap each other, the beam peripheral region of one of the two adjacent stimulating rays, at which beam peripheral region the intensity of the stimulating rays is low, overlaps upon the beam peripheral region of the other stimulating rays, at which beam peripheral region the intensity of the stimulating rays is low. As a result, as indicated by the broken line in FIG. 3, the stimulating ray intensity at the overlapping region becomes high. Accordingly, the intensity of the stimulating rays along the main scanning direction becomes uniform.

In cases where it is difficult for the intensity of the stimulating rays along the main scanning direction to be made perfectly uniform, the digital image signal D may be corrected such that the nonuniformity in intensity of the stimulating rays is compensated for.

Figure 7:
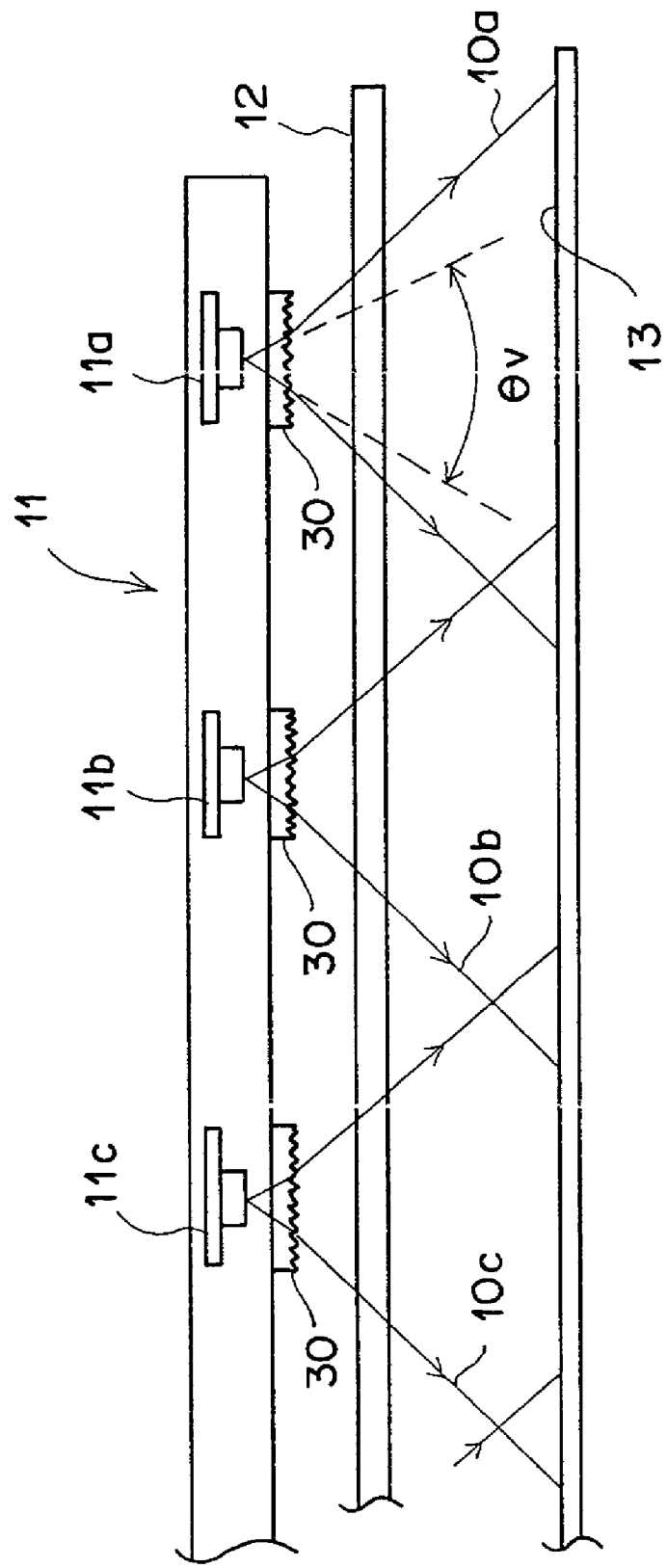
FIG. 7 is a front view showing a read-out optical system employed in a second embodiment of the radiation image read-out apparatus in accordance with the present invention.
Figure 8:
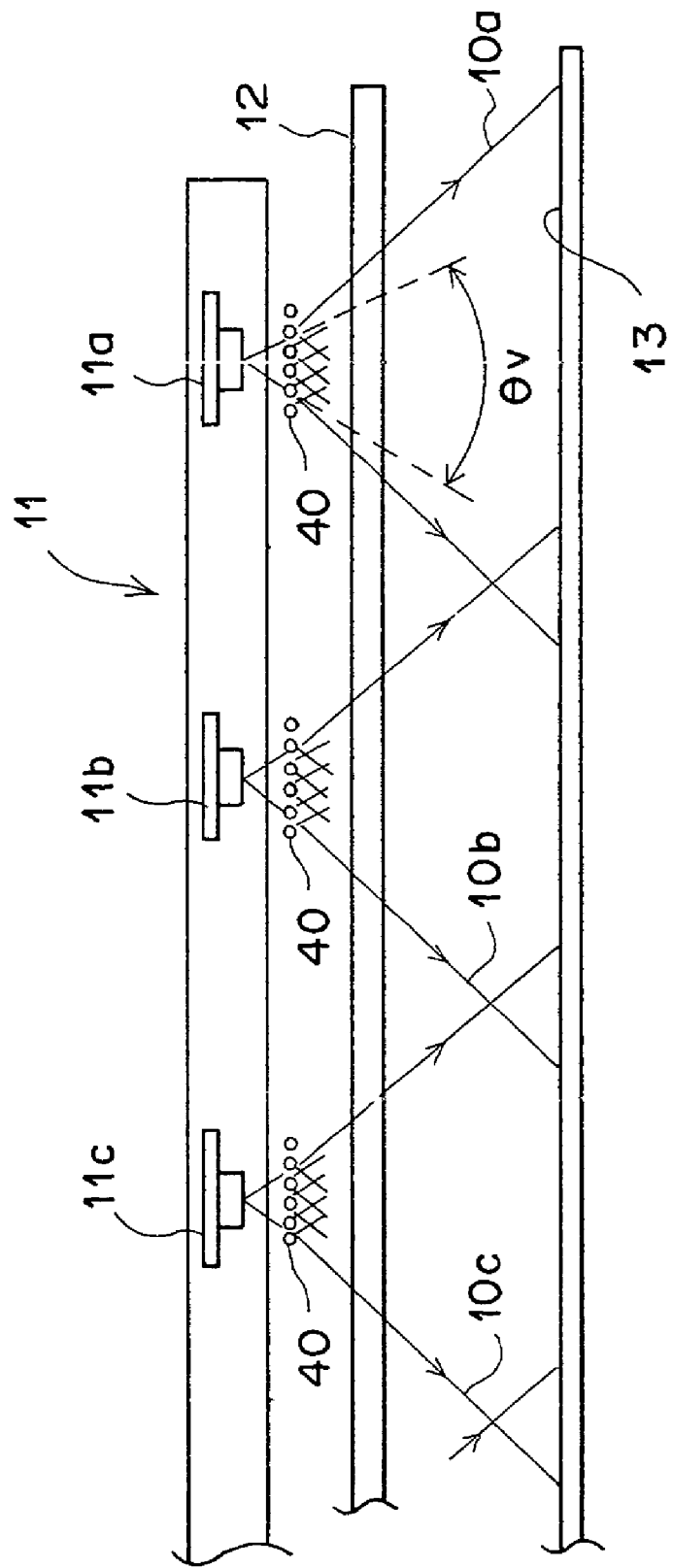
FIG. 8 is a front view showing a read-out optical system employed in a third embodiment of the radiation image read-out apparatus in accordance with the present invention.

A second embodiment of the radiation image read-out apparatus in accordance with the present invention will be described hereinbelow with reference to FIG. 7. FIG. 7 is a front view showing a read-out optical system employed in the second embodiment of the radiation image read-out apparatus in accordance with the present invention. In FIG. 7 (and in FIG. 8), similar elements are numbered with the same reference numerals with respect to FIG. 3.

Basically, the second embodiment of the radiation image read-out apparatus in accordance with the present invention is constituted in the same manner as that in the first embodiment described above, except that each of diffraction gratings 30, 30, . . . is located between one of the laser diodes 11a, 11b, 11c, . . . , which constitute the laser diode array 11, and the cylindrical lens 12. Each of the diffraction gratings 30, 30, . . . scatters the corresponding one of the stimulating rays 10a, 10b, 10c, . . . having been produced by the laser diodes 11a, 11b, 11c, . . . . In the second embodiment, the stimulating rays 10a, 10b, 10c, . . . , which have been produced by the laser diodes 11a, 11b, 11c, . . . , are diffracted respectively by the diffraction gratings 30, 30, . . . The stimulating rays 10a, 10b, 10c, . . . impinge in a slightly scattered state upon the cylindrical lens 12.

Therefore, with the second embodiment of the radiation image read-out apparatus in accordance with the present invention, the stimulating rays 10a, 10b, 10c, . . . , which have been produced by the laser diodes 11a, 11b, 11c, . . . , impinge upon the stimulable phosphor sheet 13 in a state in which the stimulating rays 10a, 10b, 10c, . . . spread more widely than in the first embodiment described above. Accordingly, in cases where an identical main scanning width is to be obtained, the distance between the laser diodes 11a, 11b, 11c, . . . and the stimulable phosphor sheet 13 is capable of being set to be shorter than in the first embodiment described above. As a result, the size of the radiation image read-out apparatus is capable of being minimized.

Also, with the second embodiment of the radiation image read-out apparatus in accordance with the present invention, wherein the stimulating rays 10a, 10b, 10c, . . . having been produced by the laser diodes 11a, 11b, 11c, . . . are diffracted and scattered by the corresponding diffraction gratings 30, 30, . . . , the original intensity distributions (i.e., the Gaussian intensity distributions) of the stimulating rays 10a, 10b, 10c, . . . are disturbed by the scattering with the diffraction gratings 30, 30, . . . . Therefore, the intensities of the stimulating rays 10a, 10b, 10c, . . . , which impinge upon the stimulable phosphor sheet 13, become more uniform than when the stimulating rays 10a, 10b, 10c, . . . having been produced by the laser diodes 11a, 11b, 11c, . . . are not scattered by the diffraction gratings 30, 30, . . .

In the second embodiment of the radiation image read-out apparatus in accordance with the present invention, as in the first embodiment described above, each of the laser diodes 11a, 11b, 11c, . . . is located in the orientation such that the beam spread direction, in which the large beam spread angle $\theta_V$ is obtained, coincides with the direction, along which the stimulating rays 10a, 10b, 10c, . . . stand in a row. Alternatively, in cases where each of the laser diodes 11a, 11b, 11c, . . . is located in other orientations, the stimulating rays 10a, 10b, 10c, . . . may be scattered by the diffraction gratings 30, 30, . . . . In such cases, the same effects as those described above are also capable of being obtained.

However, the radiation image read-out apparatus in accordance with the present invention should preferably have both the feature, wherein each of the laser diodes 11a, 11b, 11c, . . . is located in the orientation such that the beam spread direction, in which the large beam spread angle $\theta_V$ is obtained, coincides with the direction, along which the stimulating rays 10a, 10b, 10c, . . . stand in a row, and the feature, wherein the diffraction gratings 30, 30, . . . are utilized. In such cases, synergistic effects are capable of being obtained from the two features described above.

In the second embodiment of the radiation image read-out apparatus in accordance with the present invention, the diffraction gratings 30, 30, . . . are employed as the optical devices for scattering the stimulating rays 10a, 10b, 10c, . . . Alternatively, as in a third embodiment shown in FIG. 8, optical fiber bundles 40, 40, . . . , each of which is constituted of a plurality of optical fibers bundled together, may be employed as the optical devices for scattering the stimulating rays 10a, 10b, 10c, . . . . In the third embodiment of FIG. 8, the optical fiber bundles 40, 40, . . . are located such that the stimulating rays 10a, 10b, 10c, . . . travel across the corresponding optical fiber bundles 40, 40, . . . . As another alternative, microlens arrays, or the like, maybe employed as the optical devices for scattering the stimulating rays 10a, 10b, 10c, . . .

A fourth embodiment of the radiation image read-out apparatus in accordance with the present invention will be described hereinbelow.

Figure 9:
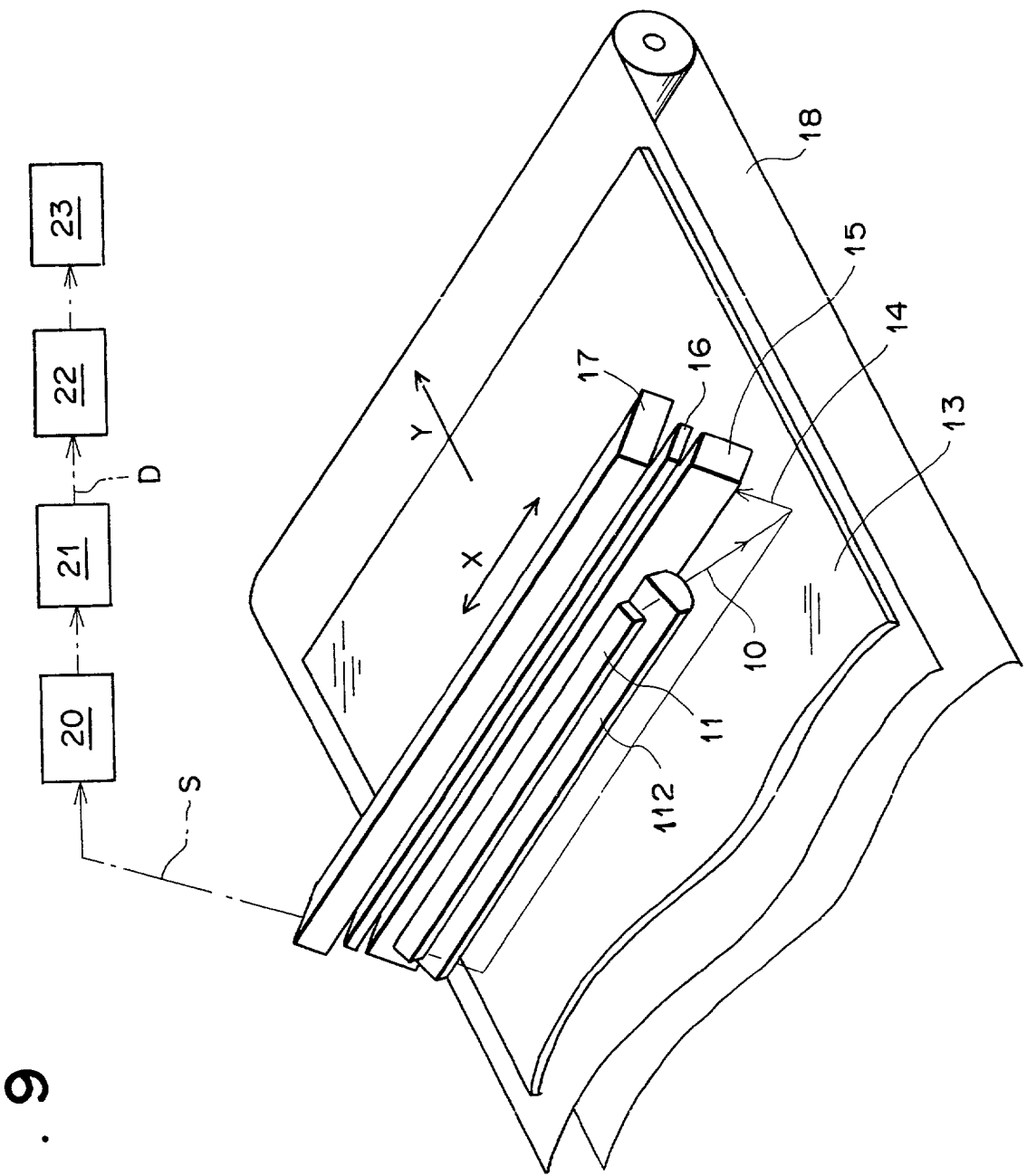
FIG. 9 is a perspective view showing a fourth embodiment of the radiation image read-out apparatus in accordance with the present invention.
Figure 10:
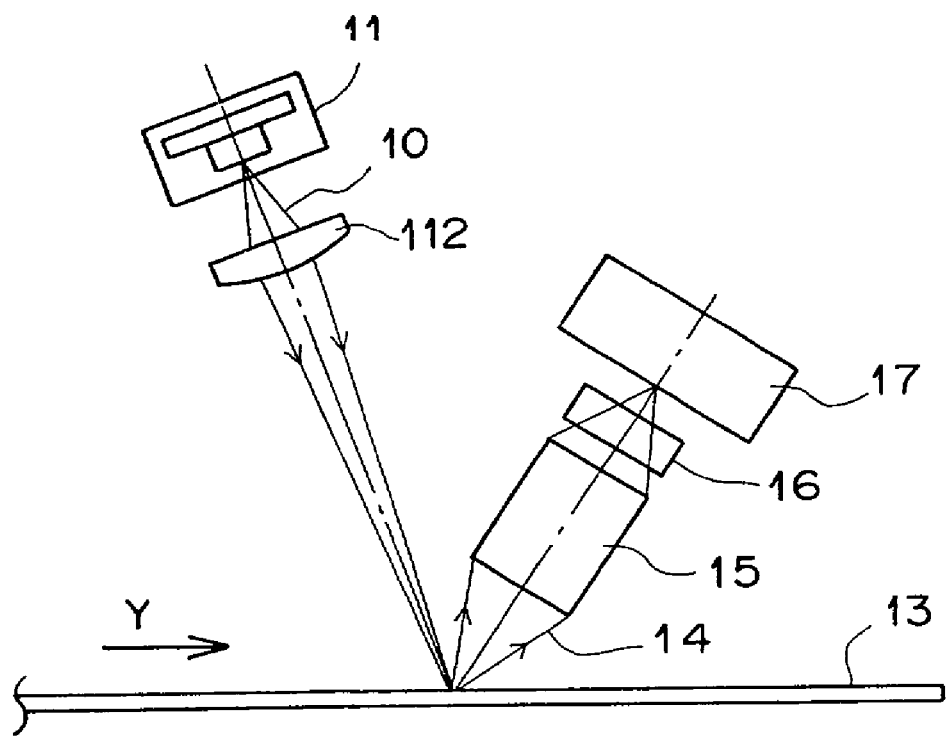
FIG. 10 is a side view showing a read-out optical system employed in the fourth embodiment of FIG. 9.
Figure 11:
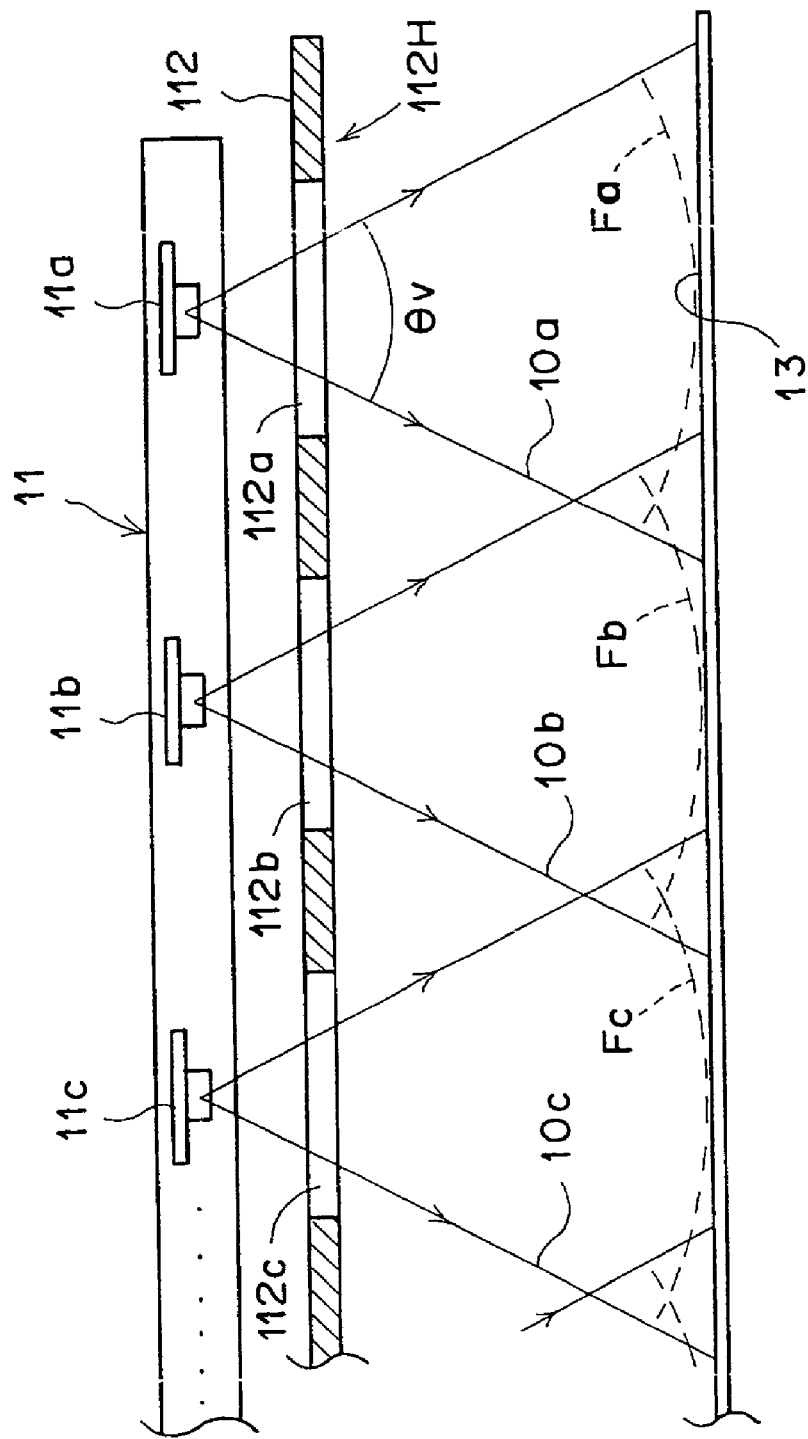
FIG. 11 is a front view showing the read-out optical system of FIG. 10.

FIG. 9 is a perspective view showing a fourth embodiment of the radiation image read-out apparatus in accordance with the present invention. FIG. 10 is a side view showing a read-out optical system employed in the fourth embodiment of FIG. 9. FIG. 11 is a front view showing the read-out optical system of FIG. 10.

As illustrated in FIG. 9, the radiation image read-out apparatus comprises the laser diode array 11 for producing the fan beam-like stimulating rays 10. The radiation image read-out apparatus also comprises a lens array 112 for converging the stimulating rays 10 only in the plane of the sheet of FIG. 10 in order to form the linear stimulating rays 10. The radiation image read-out apparatus further comprises the lens array 15 for collecting the light 14, which has been emitted from the linear area of the stimulable phosphor sheet 13 exposed to the linear stimulating rays 10. The radiation image read-out apparatus still further comprises the stimulating ray cut-off filter 16, which is located in the optical path of the emitted light 14 having passed through the lens array 15. The radiation image read-out apparatus also comprises the CCD line sensor 17 for detecting the emitted light 14, which has passed through the stimulating ray cut-off filter 16. The radiation image read-out apparatus further comprises the endless belt 18, which acts as the sub-scanning means for moving the stimulable phosphor sheet 13 at the predetermined speed and in the direction indicated by the arrow Y, i.e. in the direction normal to the length direction (the direction indicated by the double headed arrow X) of the linear area of the stimulable phosphor sheet 13 exposed to the linear stimulating rays 10.

The radiation image read-out apparatus still further comprises the amplifier 20 for amplifying the analog light detection signal S, which has been fed out from the CCD line sensor 17. The radiation image read-out apparatus also comprises the analog-to-digital converter 21 for digitizing the analog light detection signal S, which has been amplified by the amplifier 20, into the digital image signal D. The digital image signal D, which has been obtained from the analog-to-digital converter 21, is fed into the image processing unit 22, which performs the image processing on the digital image signal D. The digital image signal D, which has been obtained from the image processing performed by the image processing unit 22, is fed into the image reproducing apparatus 23.

As illustrated in FIG. 11, the laser diode array 11 comprises the plurality of the laser diodes 11a, 11b, 11c, . . . arrayed in a line. By way of example, each of the laser diodes 11a, 11b, 11c, . . . produces the laser beam (the stimulating rays) having a wavelength of 660 nm. The laser diodes 11a, 11b, 11c, . . . respectively produce the stimulating rays 10a, 10b, 10c, . . . in a divergent light state. The stimulating rays 10a, 10b, 10c, . . . which have been produced by the laser diodes 11a, 11b, 11c, . . . are respectively converged by cylindrical lenses 112a, 112b, 112c, . . . , which constitute the lens array 112, with respect to only one direction and into fan beams. The stimulating rays 10, which are composed of the fan beams standing in a row, are linearly irradiated onto the linear area of the stimulable phosphor sheet 13.

As illustrated in FIG. 4, the CCD line sensor 17 comprises the plurality of the sensor chips (the photoelectric conversion devices) 17a, 17a, . . . , which are arrayed in a line. In this embodiment, the light receiving width of the CCD line sensor 17, which light receiving width is taken in the direction normal to the array direction of the sensor chips 17a, 17a, . . . , i.e. the width W of each of the sensor chips 17a, 17a, . . . , is approximately equal to 100 µm.

The CCD line sensor 17 is located in the orientation such that the sensor chips 17a, 17a, . . . stand side by side along the length direction of the linear area of the stimulable phosphor sheet 13 exposed to the linear stimulating rays 10, i.e. along the direction indicated by the double headed arrow X in FIG. 9. In cases where the stimulable phosphor sheet 13 has a large width, the CCD line sensor 17 may be composed of a plurality of line sensors, which are arrayed so as to stand in a row along the length direction of the CCD line sensor 17.

As illustrated in FIGS. 5A and 5B, the lens array 15 comprises, for example, the plurality of the distributed index lenses 15a, 15b, 15c, 15d, . . . , which are arrayed in a line. Each of the distributed index lenses 15a, 15b, 15c, 15d, . . . collects the emitted light 14 having been emitted by the stimulable phosphor sheet 13. Also, as illustrated in FIG. 9, each of the distributed index lenses 15a, 15b, 15c, 15d, . . . guides the emitted light 14 toward the CCD line sensor 17. The lens array 15 is located in the orientation such that the distributed index lenses 15a, 15b, 15c, 15d, . . . stand side by side along the length direction of the linear area of the stimulable phosphor sheet 13 exposed to the linear stimulating rays 10, i.e. along the direction indicated by the double headed arrow X in FIG. 9.

How the fourth embodiment of the radiation image read-out apparatus in accordance with the present invention operates will be described hereinbelow.

The stimulable phosphor sheet 13 carries the radiation image of the object stored thereon by, for example, being exposed to radiation carrying the radiation image information of the object. The stimulable phosphor sheet 13, on which the radiation image has been stored, is moved by the endless belt 18 at the predetermined speed and in the direction indicated by the arrow Y. Also, the stimulating rays 10 are produced by the laser diode array 11. The stimulating rays 10, which have been produced by the laser diode array 11, are linearly irradiated to the are a of the stimulable phosphor sheet 13.

When the stimulating rays 10 are linearly irradiated to the area of the stimulable phosphor sheet 13, the linear area of the stimulable phosphor sheet 13 exposed to the linear stimulating rays 10 emits the light 14 having the intensity in accordance with the radiation image having been stored on the stimulable phosphor sheet 13. The emitted light 14, which may be, for example, blue light, is collected by the lens array 15 and guided toward the CCD line sensor 17. The emitted light 14 is photoelectrically detected by the CCD line sensor 17. The stimulating rays 10, which are reflected from the stimulable phosphor sheet 13 and travel toward the CCD line sensor 17, are filtered out by the stimulating ray cut-off filter 16.

The CCD line sensor 17 photoelectrically detects the emitted light 14 and feeds out the analog light detection signal S, which corresponds to the intensity of the emitted light 14 (i.e., which represents the radiation image having been stored on the stimulable phosphor sheet 13). The analog light detection signal S is amplified by the amplifier 20 and converted by the analog-to-digital converter 21 into the digital image signal D.

Thereafter, the digital image signal D is fed into the image processing unit 22, which performs the image processing, such as gradation processing, on the digital image signal D. The digital image signal D, which has been obtained from the image processing performed by the image processing unit 22, is fed into the image reproducing apparatus 23 and is utilized for reproducing the radiation image, which has been stored on the stimulable phosphor sheet 13, as a visible image. The image reproducing apparatus 23 may be displaying means constituted of a CRT display device, or the like. Alternatively, the image reproducing apparatus 23 may be a recording apparatus for performing light scanning recording on photosensitive film.

How the stimulating rays 10a, 10b, 10c, . . . are converged will be described hereinbelow with reference to FIG. 11. In the fourth embodiment of the radiation image read-out apparatus in accordance with the present invention, the output of each of the laser diodes 11a, 11b, 11c, . . . constituting the laser diode array 11 is 50 mW. By way of example, the laser diode array 11 comprises 30 laser diodes 11a, 11b, 11c, . . . . The large number of the laser diodes 11a, 11b, 11c, . . . are thus utilized, and the stimulating rays 10a, 10b, 10c, . . . , which have been produced by the laser diodes 11a, 11b, 11c, . . . , are set so as to stand in a row and are linearly irradiated to the stimulable phosphor sheet 13. Therefore, with the fourth embodiment of the radiation image read-out apparatus in accordance with the present invention, in cases where an identical main scanning width is to be obtained, the distance between the laser diodes 11a, 11b, 11c, . . . and the stimulable phosphor sheet 13 is capable of being set to be shorter than when only one laser diode is utilized. As a result, the size of the radiation image read-out apparatus is capable of being kept small.

In the fourth embodiment, the cylindrical lenses 112a, 112b, 112c, . . . are located so as to correspond respectively to the laser diodes 11a, 11b, 11c, . . . The cylindrical lenses 112a, 112b, 112c, . . . are connected with one another by connecting members 112H, 112H, . . . in the lens longitudinal direction in order to constitute the lens array 112.

The stimulating rays 10a, 10b, 10c, . . . are respectively radiated out in a radial form from the emission points of the laser diodes 11a, 11b, 11c, . . . . Therefore, if a curvature of each of the cylindrical lenses 112a, 112b, 112c, . . . , which curvature is taken in the plane of the sheet of FIG. 10, is uniform over the lens longitudinal direction, the stimulating rays 10a, 10b, 10c, . . . will be respectively converged to the positions indicated by the broken lines Fa, Fb, Fc, . . . in FIG. 11.

Specifically, if the curvature of each of the cylindrical lenses 112a, 112b, 112c, . . . is uniform over the lens longitudinal direction, the beam diameter of each of the stimulating rays 10a, 10b, 10c, . . . , which beam diameter is taken at the linear area of the stimulable phosphor sheet 13 exposed to the linear stimulating rays 10 (i.e., at the main scanning line), will take the minimum value at the center region of the stimulating ray beam and will become large at the peripheral region of the beam. In such cases, the problems will occur in that the radiation image having been stored on the stimulable phosphor sheet 13 cannot be read out accurately with a high sharpness.

Figure 12:
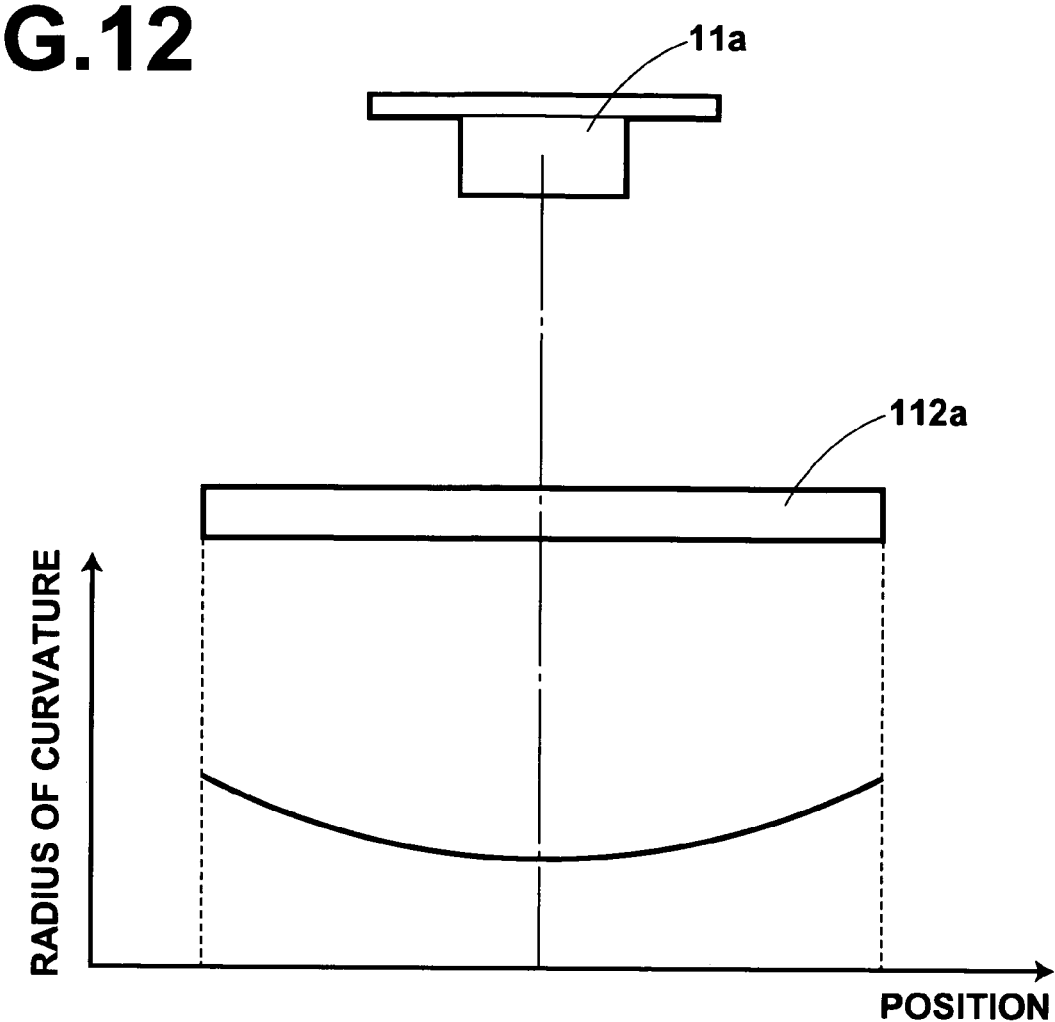
FIG. 12 is an explanatory view showing how curvature of a cylindrical lens, which is employed in the fourth embodiment of FIG. 9, is varied along a lens longitudinal direction.

In the fourth embodiment, in order for such problems to be eliminated, the curvature of each of the cylindrical lenses 112a, 112b, 112c, . . . is varied over the lens longitudinal direction. FIG. 12 shows the variation of the curvature by taking the cylindrical lens 112a as an example. As illustrated in FIG. 12, the curvature of the cylindrical lens 112a takes the maximum value (i.e., the radius of curvature of the cylindrical lens 112a takes the minimum value) at the position, through which the center region of the beam of the stimulating rays 10a passes. Also, the curvature of the cylindrical lens 112a takes a small value (i.e., the radius of curvature of the cylindrical lens 112a takes a large value) at the position, through which the peripheral region of the beam of the stimulating rays 10a passes. Each of the other cylindrical lenses 112b, 112c, . . . also has the curvature varying in the same manner as that described above.

In cases where the cylindrical lenses 112a, 112b, 112c, . . . having the curvature varying in the lens longitudinal direction are utilized for respectively converging the stimulating rays 10a, 10b, 10c, . . . , which have been produced by the laser diodes 11a, 11b, 11c, . . . , the positions, to which the peripheral regions of the beams of the stimulating rays 10a, 10b, 10c, . . . are converged, shift from the side close to the laser diodes 11a, 11b, 11c, . . . toward the side remote from the laser diodes 11a, 11b, 11c, . . . . Therefore, the stimulating rays 10a, 10b, 10c, . . . are capable of being converged onto the main scanning line on the stimulable phosphor sheet 13, and the beam diameter of the stimulating rays 10 is capable of being made uniform along the main scanning line.

In the fourth embodiment described above, the cylindrical lenses 112a, 112b, 112c, . . . are formed as the plurality of independent cylindrical lenses. Alternatively, a cylindrical lens for converging the stimulating rays 10a, 10b, 10c, . . . may be formed from a single optical glass member. In such case, the curvature of each of the regions of the cylindrical lens, through which regions the stimulating rays 10a, 10b, 10c, . . . respectively pass, may be varied over the lens longitudinal direction as in the fourth embodiment described above. In this manner, the same effects as those in the fourth embodiment are capable of being obtained.

Also, as for each of the laser diodes 11a, 11b, 11c, . . . employed in the fourth embodiment, the beam spread angle $\theta_V$ in the direction normal to the junction plane, which beam spread angle is illustrated in FIG. 11, is equal to 22°. The beam spread angle $\theta_H$ in the direction parallel with the junction plane is equal to 10°. In the fourth embodiment, each of the laser diodes 11a, 11b, 11c, . . . is located in an orientation such that the beam spread direction, in which the beam spread angle $\theta_V$ of as large as 22° is obtained, coincides with the direction, along which the stimulating rays 10a, 10b, 10c, . . . stand in a row. Therefore, the stimulating rays 10a, 10b, 10c, . . . , which have been produced by the laser diodes 11a, 11b, 11c, . . . , impinge upon the stimulable phosphor sheet 13 in a state in which the stimulating rays 10a, 10b, 10c, . . . spread more widely than when each of the laser diodes 11a, 11b, 11c, . . . is located in other orientations. Accordingly, the distance between the laser diodes 11a, 11b, 11c, . . . and the stimulable phosphor sheet 13 is capable of being set to be short. As a result, the size of the radiation image read-out apparatus is capable of being minimized.

Further, with the fourth embodiment of the radiation image read-out apparatus in accordance with the present invention, wherein the laser diodes 11a, 11b, 11c, . . . are located in the orientation described above such that the stimulating rays 10a, 10b, 10c, . . . having been produced by the laser diodes 11a, 11b, 11c, . . . spread widely, a change in beam intensity (i.e., a change in intensity of the stimulating rays) along the main scanning line becomes smaller than when the laser diodes 11a, 11b, 11c, . . . are located in other orientations, i.e. than when the spread of the stimulating rays 10a, 10b, 10c, . . . is small. FIGS. 13A and 13B show such effects of the fourth embodiment by taking the laser diode 11a as an example.

FIG. 13A shows how the intensity of the stimulating rays 10a is distributed along the main scanning direction indicated by the double headed arrow X on the stimulable phosphor sheet 13 in cases where the laser diode 11a is located in the orientation such that the beam spread direction, which is normal to the junction plane, coincides with the direction, along which the stimulating rays 10a, 10b, 10c, . . . stand in a row, as in the fourth embodiment. FIG. 13B shows how the intensity of the stimulating rays 10a is distributed along the main scanning direction indicated by the double headed arrow X on the stimulable phosphor sheet 13 in cases where the laser diode 11a is located in an orientation such that the beam spread direction, which is parallel with the junction plane, coincides with the direction, along which the stimulating rays 10a, 10b, 10c, . . . stand in a row. As illustrated in FIGS. 13A and 13B, with the fourth embodiment of the radiation image read-out apparatus in accordance with the present invention, in cases where an identical main scanning width Ls is to be obtained, the intensity of the stimulating rays 10a over the main scanning width Ls becomes more uniform than when the laser diode is located in other orientations.

Furthermore, in the fourth embodiment of the radiation image read-out apparatus in accordance with the present invention, as illustrated in FIG. 11, the laser diodes 11a, 11b, 11c, . . . are located such that the stimulating rays, which have been produced by the laser diodes adjacent to each other among the plurality of the laser diodes 11a, 11b, 11c, . . . , (specifically, for example, the stimulating rays 10a and the stimulating rays 10b, the stimulating rays 10b and the stimulating rays 10c, and so on) stand in a row so as to have an overlapping region, at which the stimulating rays overlap each other. At the bottom part of FIG. 11, the intensity distributions of the stimulating rays 10a, 10b, 10c, . . . along the main scanning direction are also illustrated. As clear from the intensity distributions shown in FIG. 11, in cases where the two adjacent stimulating rays have the overlapping region, at which the stimulating rays overlap each other, the beam peripheral region of one of the two adjacent stimulating rays, at which beam peripheral region the intensity of the stimulating rays is low, overlaps upon the beam peripheral region of the other stimulating rays, at which beam peripheral region the intensity of the stimulating rays is low. As a result, as indicated by the broken line in FIG. 11, the stimulating ray intensity at the over lapping region becomes high. Accordingly, the intensity of the stimulating rays along the main scanning direction becomes uniform.

In cases where it is difficult for the intensity of the stimulating rays along the main scanning direction to be made perfectly uniform, the digital image signal D may be corrected such that the nonuniformity in intensity of the stimulating rays is compensated for.

In the first, second, third, and fourth embodiments of the radiation image read-out apparatus in accordance with the present invention, the stimulable phosphor sheet for storing the radiation image may be an ordinary stimulable phosphor sheet having both the functions for absorbing radiation and the functions for storing energy from the radiation. Alternatively, the stimulable phosphor sheet may be a stimulable phosphor sheet proposed in, for example, Japanese Patent Application No. 11(1999)-372978. With the proposed stimulable phosphor sheet, such that the functions for absorbing radiation and the functions for storing energy from the radiation may be separated from each other, the stimulable phosphor sheet is provided with a layer of a stimulable phosphor for energy storage. In cases where the stimulable phosphor sheet provided with the layer of the stimulable phosphor for energy storage is utilized, the detection quantum efficiency in the formation of the radiation image, i.e., the radiation absorptivity, the light emission efficiency, the emitted light pickup efficiency, and the like, is capable of being enhanced as a whole. Therefore, the image quality of the reproduced image is capable of being enhanced even further.

Further, the stimulable phosphor sheet employed in the first, second, third, and fourth embodiments of the radiation image read-out apparatus in accordance with the present invention may be a stimulable phosphor sheet for energy subtraction processing, which stores two radiation images of a single object formed with radiation having different energy distributions, the stimulable phosphor sheet being capable of emitting light, which carries information of one of the two radiation images, from one surface, and emitting light, which carries information of the other radiation image, from the other surface.

In such cases, the radiation image read-out apparatus in accordance with the present invention may comprise two line sensors, each of which is located on one of the opposite surface sides of the stimulable phosphor sheet, the two line sensors detecting two image signals, each of which is made up of a series of image signal components representing pixels in the radiation image, from the opposite surfaces of the stimulable phosphor sheet. Further, in such cases, the radiation image read-out apparatus in accordance with the present invention may be provided with reading means for performing a subtraction process on image signal components of the two image signals, which image signal components represent corresponding pixels on the opposite surfaces of the stimulable phosphor sheet.

As the stimulable phosphor sheet for energy subtraction processing, it is possible to employ an anisotropic stimulable phosphor sheet, such as a stimulable phosphor sheet, wherein the light emission region of the stimulable phosphor sheet is partitioned by a stimulating ray reflecting partition member, which extends in the thickness direction of the stimulable phosphor sheet, into a plurality of fine cells.

In the first, second, third, and fourth embodiments of the radiation image read-out apparatus in accordance with the present invention, the stimulable phosphor sheet 13 is moved by the endless belt 18 at the predetermined speed, and the sub-scanning with the stimulating rays 10 is thereby performed. However, the means for the sub-scanning with the stimulating rays 10 is not limited to the technique utilizing the endless belt 18. For example, rollers may be utilized for moving the stimulable phosphor sheet 13. As another alternative, the stimulable phosphor sheet 13 may be kept stationary, and the stimulating ray irradiating means and the line sensor, and the like, may be moved together with respect to the stimulable phosphor sheet 13.

What is claimed is:

1. A radiation image read-out method, comprising the steps of:
   i) linearly irradiating stimulating rays through a cylindrical lens onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation,
   ii) receiving light, which is emitted by the stimulable phosphor sheet, with a line sensor comprising a plurality of photoelectric conversion devices arrayed along the linear area of the stimulable phosphor sheet exposed to the linear stimulating rays, the received light being subjected to photoelectric conversion performed by the line sensor, and
   iii) moving the stimulable phosphor sheet with respect to the stimulating ray irradiating means and the line sensor and in a direction intersecting with a length direction of the linear area of the stimulable phosphor sheet exposed to the linear stimulating rays,
   wherein the stimulating ray irradiating means comprises:
   a plurality of laser diodes located such that laser beams, which have been produced by the laser diodes and act as the stimulating rays, stand in a row along the length direction of the linear area of the stimulable phosphor sheet exposed to the linear stimulating rays, each of the laser diodes being located in an orientation such that a beam spread direction, which is normal to a junction plane, approximately coincides with the direction, along which the laser beams stand in a row, and
   the cylindrical lens operable to converge each of the laser beams, which have been produced by the laser diodes, only in a plane normal to the direction, along which the laser beams stand in a row, and onto the stimulable phosphor sheet.

2. A radiation image read-out method, comprising the steps of:
   i) linearly irradiating stimulating rays through a cylindrical lens onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation,
   ii) receiving light, which is emitted by the stimulable phosphor sheet, with a line sensor comprising a plurality of photoelectric conversion devices arrayed along the linear area of the stimulable phosphor sheet exposed to the linear stimulating rays, the received light being subjected to photoelectric conversion performed by the line sensor, and iii) moving the stimulable phosphor sheet with respect to the stimulating ray irradiating means and the line sensor and in a direction intersecting with a length direction of the linear area of the stimulable phosphor sheet exposed to the linear stimulating rays, wherein the stimulating ray irradiating means comprises:

a plurality of laser diodes located such that laser beams, which have been produced by the laser diodes and act as the stimulating rays, stand in a row along the length direction of the linear area of the stimulable phosphor sheet exposed to the linear stimulating rays, the cylindrical lens for converging each of the laser beams, which have been produced by the laser diodes, only in a plane normal to the direction, along which the laser beams stand in a row, and onto the stimulable phosphor sheet, and optical devices, each of which is located between one of the laser diodes and the cylindrical lens and scatters the laser beam having been produced by the corresponding laser diode; wherein each of the laser diodes are located in an orientation such that a beam spread direction, which is normal to a junction plane, approximately coincides with the direction, along which the laser beams stand in a row.

3. A radiation image read-out method, comprising the steps of:

i) linearly irradiating stimulating rays through a cylindrical lens onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation, ii) receiving light, which is emitted by the stimulable phosphor sheet, with a line sensor comprising a plurality of photoelectric conversion devices arrayed along the linear area of the stimulable phosphor sheet exposed to the linear stimulating rays, the received light being subjected to photoelectric conversion performed by the line sensor, and iii) moving the stimulable phosphor sheet with respect to the stimulating ray irradiating means and the line sensor and in a direction intersecting with a length direction of the linear area of the stimulable phosphor sheet exposed to the linear stimulating rays, wherein the stimulating ray irradiating means comprises:

a plurality of laser diodes located such that laser beams, which have been produced by the laser diodes and act as the stimulating rays, stand in a row along the length direction of the linear area of the stimulable phosphor sheet exposed to the linear stimulating rays, each of the laser diodes being located in an orientation such that a beam spread direction, which is normal to a junction plane, approximately coincides with the direction, along which the laser beams stand in a row, the cylindrical lens for converging each of the laser beams, which have been produced by the laser diodes, only in a plane normal to the direction, along which the laser beams stand in a row, and onto the stimulable phosphor sheet, and optical devices, each of which is located between one of the laser diodes and the cylindrical lens and scatters the laser beam having been produced by the corresponding laser diode.

4. A method as defined in claim 1, 2, or 3 wherein the plurality of the laser diodes are located such that the laser beams, which have been produced by the laser diodes adjacent to each other among the plurality of the laser diodes, stand in a row so as to have an overlapping region, at which the laser beams overlap each other.

5. The radiation image read-out method as claimed in any one of claims 1–3, wherein the cylindrical lens comprises a single continuous cylindrical surface.

6. A radiation image read-out apparatus, comprising:

i) stimulating ray irradiating means for linearly irradiating stimulating rays through a cylindrical lens onto an area of a stimulable phosphor sheet, on which a radiation image has been stored, the stimulating rays causing the stimulable phosphor sheet to emit light in proportion to an amount of energy stored thereon during its exposure to radiation, ii) a line sensor, which comprises a plurality of photoelectric conversion devices arrayed along the linear area of the stimulable phosphor sheet exposed to the linear stimulating rays, and iii) sub-scanning means for moving the stimulable phosphor sheet with respect to the stimulating ray irradiating means and the line sensor and in a direction intersecting with a length direction of the linear area of the stimulable phosphor sheet exposed to the linear stimulating rays, wherein the stimulating ray irradiating means comprises:

a plurality of laser diodes located such that laser beams, which have been produced by the laser diodes and act as the stimulating rays, stand in a row along the length direction of the linear area of the stimulable phosphor sheet exposed to the linear stimulating rays, each of the laser diodes being located in an orientation such that a beam spread direction, which is normal to a junction plane, approximately coincides with the direction, along which the laser beams stand in a row, and the cylindrical lens for converging each of the laser beams, which have been produced by the laser diodes, only in a plane normal to the direction, along which the laser beams stand in a row, and onto the stimulable phosphor sheet.

7. A radiation image read-out apparatus, comprising:

i) stimulating ray irradiating means for linearly irradiating stimulating rays through a cylindrical lens onto an area of a stimulable phosphor sheet, on which a radiation image has been stored, the stimulating rays causing the stimulable phosphor sheet to emit light in proportion to an amount of energy stored thereon during its exposure to radiation, ii) a line sensor, which comprises a plurality of photoelectric conversion devices arrayed along the linear area of the stimulable phosphor sheet exposed to the linear stimulating rays, and iii) sub-scanning means for moving the stimulable phosphor sheet with respect to the stimulating ray irradiating means and the line sensor and in a direction intersecting with a length direction of the linear area of the stimulable phosphor sheet exposed to the linear stimulating rays, wherein the stimulating ray irradiating means comprises:

a plurality of laser diodes located such that laser beams, which have been produced by the laser diodes and act as the stimulating rays, stand in a row along the length direction of the linear area of the stimulable phosphor sheet exposed, to the linear stimulating rays, the cylindrical lens for converging each of the laser beams, which have been produced by the laser diodes, only in a plane normal to the direction, along which the laser beams stand in a row, and onto the stimulable phosphor sheet, and optical devices, each of which is located between one of the laser diodes and the cylindrical lens and scatters the laser beam having been produced by the corresponding laser diode; wherein each of the laser diodes are located in an orientation such that a beam spread direction, which is normal to a junction plane, approximately coincides with the direction, along which the laser beams stand in a row.

8. A radiation image read-out apparatus, comprising:

i) stimulating ray irradiating means for linearly irradiating stimulating rays through a cylindrical lens onto an area of a stimulable phosphor sheet, on which a radiation image has been stored, the stimulating rays causing the stimulable phosphor sheet to emit light in proportion to an amount of energy stored thereon during its exposure to radiation, ii) a line sensor, which comprises a plurality of photo-electric conversion devices arrayed along the linear area of the stimulable phosphor sheet exposed to the linear stimulating rays, and iii) sub-scanning means for moving the stimulable phosphor sheet with respect to the stimulating ray irradiating means and the line sensor and in a direction intersecting with a length direction of the linear area of the stimulable phosphor sheet exposed to the linear stimulating rays, wherein the stimulating ray irradiating means comprises:

a plurality of laser diodes located such that laser beams, which have been produced by the laser diodes and act as the stimulating rays, stand in a row along the length direction of the linear area of the stimulable phosphor sheet exposed to the linear stimulating rays, each of the laser diodes being located in an orientation such that a beam spread direction, which is normal to a junction plane, approximately coincides with the direction, along which the laser beams stand in a row, the cylindrical lens for converging each of the laser beams, which have been produced by the laser diodes, only in a plane normal to the direction, along which the laser beams stand in a row, and onto the stimulable phosphor sheet, and optical devices, each of which is located between one of the laser diodes and the cylindrical lens and scatters the laser beam having been produced by the corresponding laser diode.

9. An apparatus as defined in claim 6, 7, or 8 wherein the plurality of the laser diodes are located such that the laser beams, which have been produced by the laser diodes adjacent to each other among the plurality of the laser diodes, stand in a row so as to have an overlapping region, at which the laser beams overlap each other.

10. The radiation image read-out apparatus as claimed in any one of claims 6–8, wherein the cylindrical lens comprises a single continuous cylindrical surface.

* * * * *